(12) United States Patent
Huff

(10) Patent No.: US 12,546,670 B1
(45) Date of Patent: Feb. 10, 2026

(54) LOW-COST, HIGH-PERFORMANCE AND HIGHLY CUSTOMIZABLE MICRO-SCALE PRESSURE AND FORCE SENSOR

(71) Applicant: CORPORATION FOR NATIONAL RESEARCH INITIATIVES, Reston, VA (US)

(72) Inventor: Michael A. Huff, Oakton, VA (US)

(73) Assignee: Corporation for National Research Initiatives, Reston, VA (US)

( * ) Notice: Subject to any disclaimer, the term of this patent is extended or adjusted under 35 U.S.C. 154(b) by 602 days.

(21) Appl. No.: 17/713,532

(22) Filed: Apr. 5, 2022

(51) Int. Cl.
| | |
|---|---|
| *G01L 1/18* | (2006.01) |
| *G01L 1/22* | (2006.01) |
| *G01L 1/26* | (2006.01) |
| *H01L 21/302* | (2006.01) |

(52) U.S. Cl.
CPC .............. *G01L 1/18* (2013.01); *G01L 1/2293* (2013.01); *G01L 1/26* (2013.01); *H01L 21/302* (2013.01)

(58) Field of Classification Search
CPC . G01L 1/18; G01L 1/2293; G01L 1/26; H01L 21/302
See application file for complete search history.

(56) References Cited

U.S. PATENT DOCUMENTS

| | | | | | |
|---|---|---|---|---|---|
| 5,095,401 | A | * | 3/1992 | Zavracky | G01L 9/0073 361/283.4 |
| 5,266,532 | A | * | 11/1993 | Russell | H10F 77/703 257/E31.13 |
| 5,348,609 | A | * | 9/1994 | Russell | B01J 19/121 257/E31.13 |
| 5,354,420 | A | * | 10/1994 | Russell | B01D 53/007 257/E31.13 |
| 6,131,466 | A | * | 10/2000 | Vigna | G01L 9/0055 73/721 |
| 7,207,227 | B2 | * | 4/2007 | Rangsten | G01L 9/0042 73/754 |
| 2008/0079531 | A1 | * | 4/2008 | Ohta | G01L 1/2293 338/2 |

(Continued)

OTHER PUBLICATIONS

Tran, et.al., The Development of a New Piezoresistive Pressure Sensor for Low Pressures, EEE Transactions on Industrial Electronics, vol. 65, No. 8, pp. 6487-6496, Aug. 2018 (Year: 2018).*

(Continued)

*Primary Examiner* — Jeffrey T Carley
*Assistant Examiner* — Jose K Abraham
(74) *Attorney, Agent, or Firm* — Nixon & Vanderhye, P.C.

(57) ABSTRACT

A pressure and force sensor and method of fabrication for the implementation of the sensor is presented that employs piezoresistive elements having high gauge factors. Example embodiments allow for the implementation of a pressure or force sensing device and method of fabrication that can be tailored to the requirements of a wide range of applications without incurring long development times and high costs. The pressure or force sensor has an unprecedented level of sensitivity and can be used to measure extremely low levels of pressure and force, or alternatively to measure extremely high levels of pressure and forces. Moreover, the example embodiments teach pressure and force sensors suitable for use in harsh environments and can be operated at high temperatures.

20 Claims, 19 Drawing Sheets

(56) References Cited

U.S. PATENT DOCUMENTS

| | | | | |
|---|---|---|---|---|
| 2009/0098704 | A1* | 4/2009 | Ohnuma | H01L 21/76254 |
| | | | | 257/E21.567 |
| 2009/0279099 | A1* | 11/2009 | Wang | G01H 9/004 |
| | | | | 73/587 |
| 2016/0153857 | A1* | 6/2016 | Matsuzawa | B81B 7/04 |
| | | | | 73/727 |
| 2017/0248484 | A1* | 8/2017 | Yotsuya | G01L 9/0052 |
| 2018/0275000 | A1* | 9/2018 | Chau | B81C 1/00142 |

OTHER PUBLICATIONS

Wu et.al., Fabrication and Testing of Bulk Micromachined Silicon Carbide Piezoresistive Pressure Sensors for High Temperature Applications, IEEE Sensors, 6, 2, Apr. 2006 (Year: 2006).*

Bhat, Silicon Micromachined Pressure Sensors, Journal of the Indian Institute of Science vol. 87, 1, Jan.-Mar. 2007 (Year: 2007).*

* cited by examiner

Table I: Calculated Membrane Edge lengths for Various Membrane Thicknesses.

| Membrane Thickness (um) | Relative Variation in Thickness (%) | Membrane Edge Length (mm) |
|---|---|---|
| 20 | +/- 1.25 | 2.09 |
| 30 | +/- 0.833 | 3.14 |
| 40 | +/- 0.625 | 4.19 |
| 50 | +/- 0.5 | 5.23 |

Fig. 4B

Table II: Some Calculated Values of the Piezoresistive Coefficients of Silicon at a Specified Dopant Type and Concentration.

| Piezoresistance Coefficient ($10^{-11}$ Pa$^{-1}$) | n-type (resistivity = 11.7 Ωcm) | p-type (resistivity = 7.8 Ωcm) |
|---|---|---|
| $\pi 11$ | -102.2 | 6.6 |
| $\pi 12$ | 53.4 | -1.1 |
| $\pi 44$ | -13.6 | 138.1 |

Fig. 4C

Table III: Transverse and Longitudinal Gauge Factors as a Function of Direction of Applied Strain and Current.

| Direction of strain | Direction of current | Configuration | Piezoresistive coefficient |
|---|---|---|---|
| <100> | <100> | Longitudinal | $\pi_{11}$ |
| <100> | <110> | Transverse | $\pi_{12}$ |
| <110> | <110> | Longitudinal | $(\pi_{11}+\pi_{12}+\pi_{44})/2$ |
| <110> | <110> | Transverse | $(\pi_{11}+\pi_{12}-\pi_{44})/2$ |
| <111> | <111> | Longitudinal | $(\pi_{11}+2\pi_{12}+2\pi_{44})/2$ |

Fig. 4D

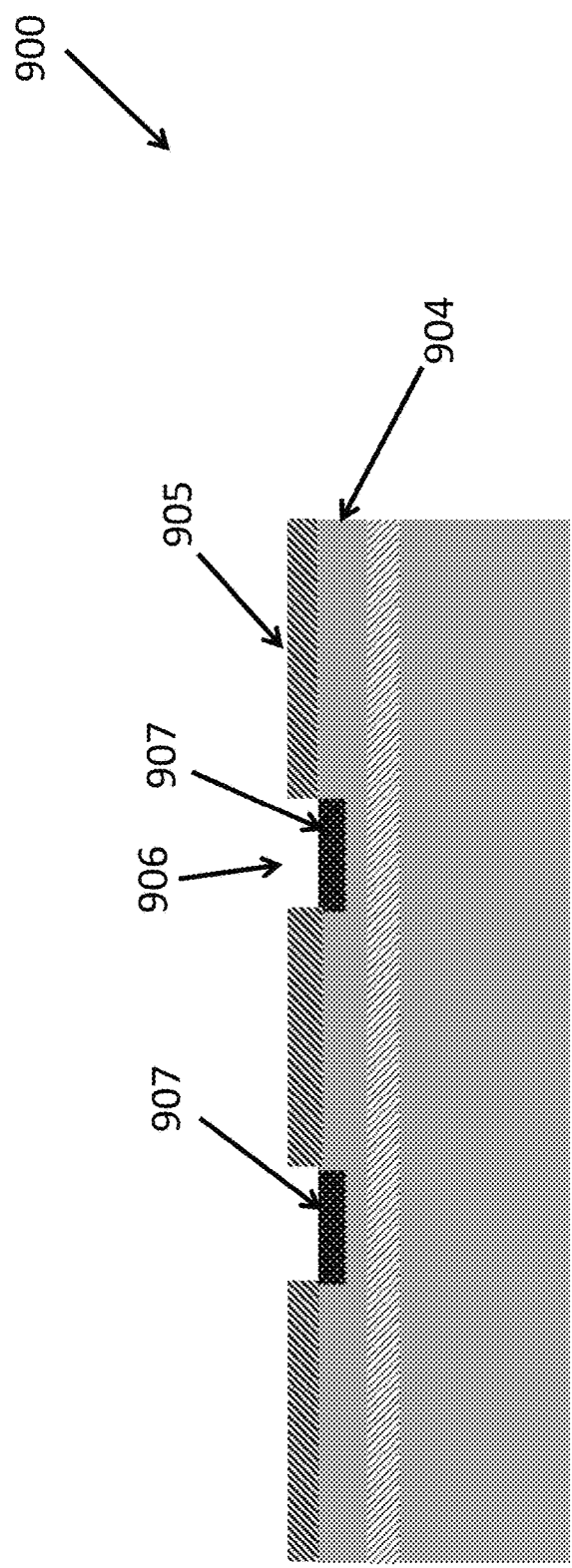
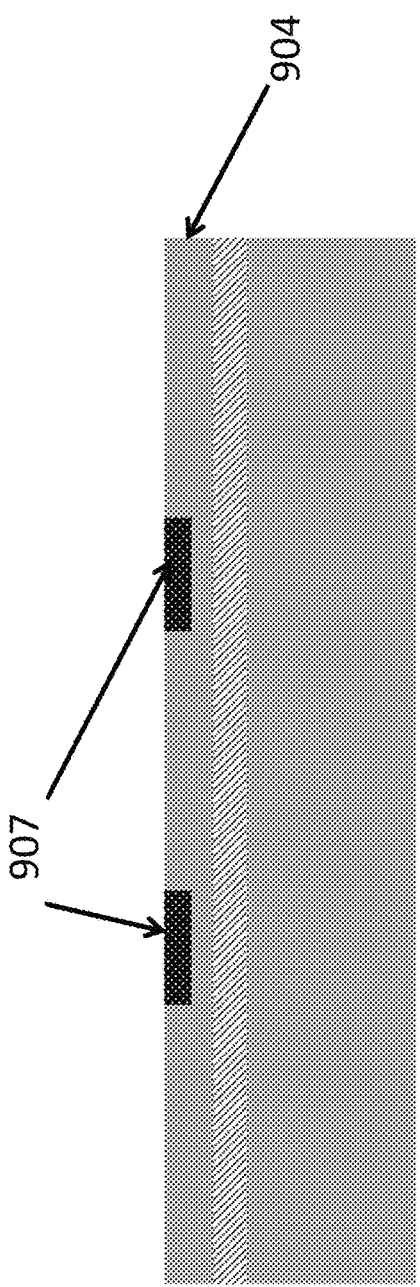
Fig. 9C
Fig. 9D

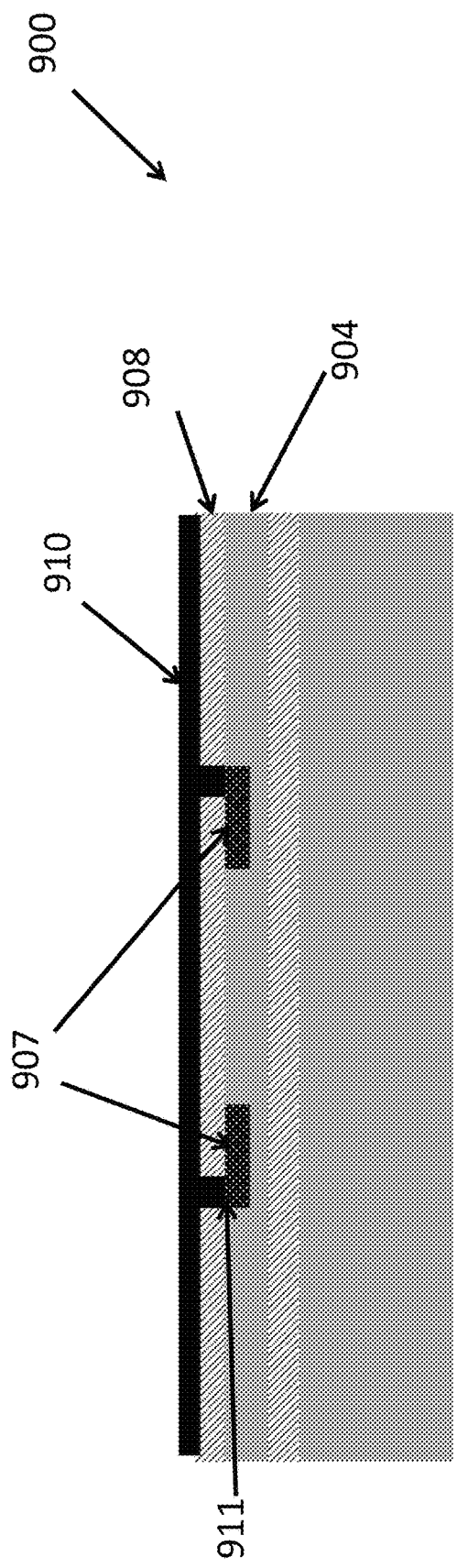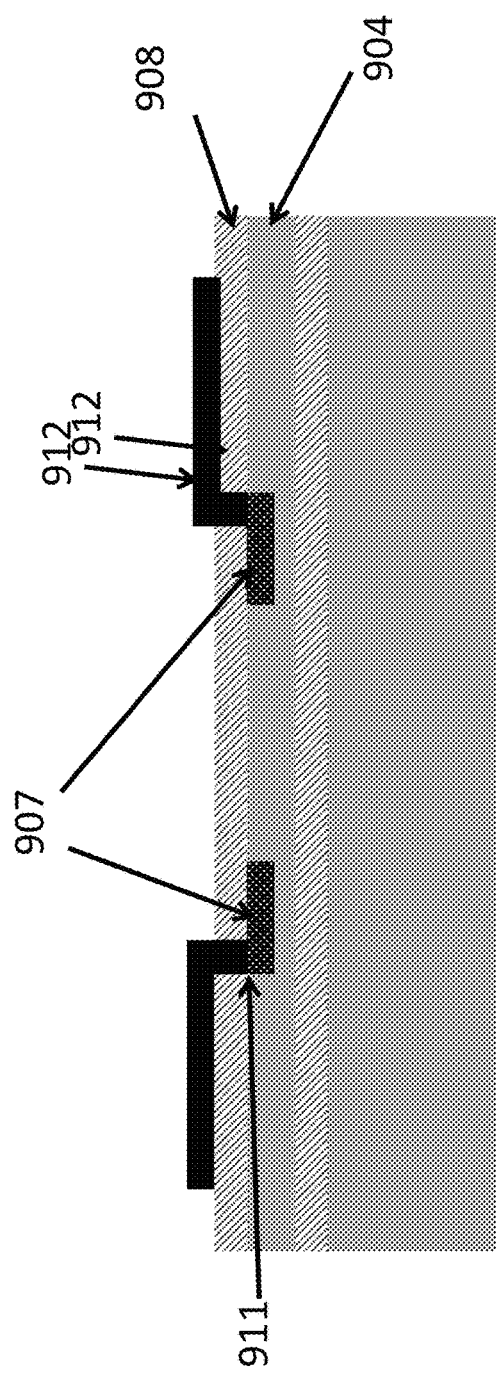
Fig. 9G
Fig. 9H

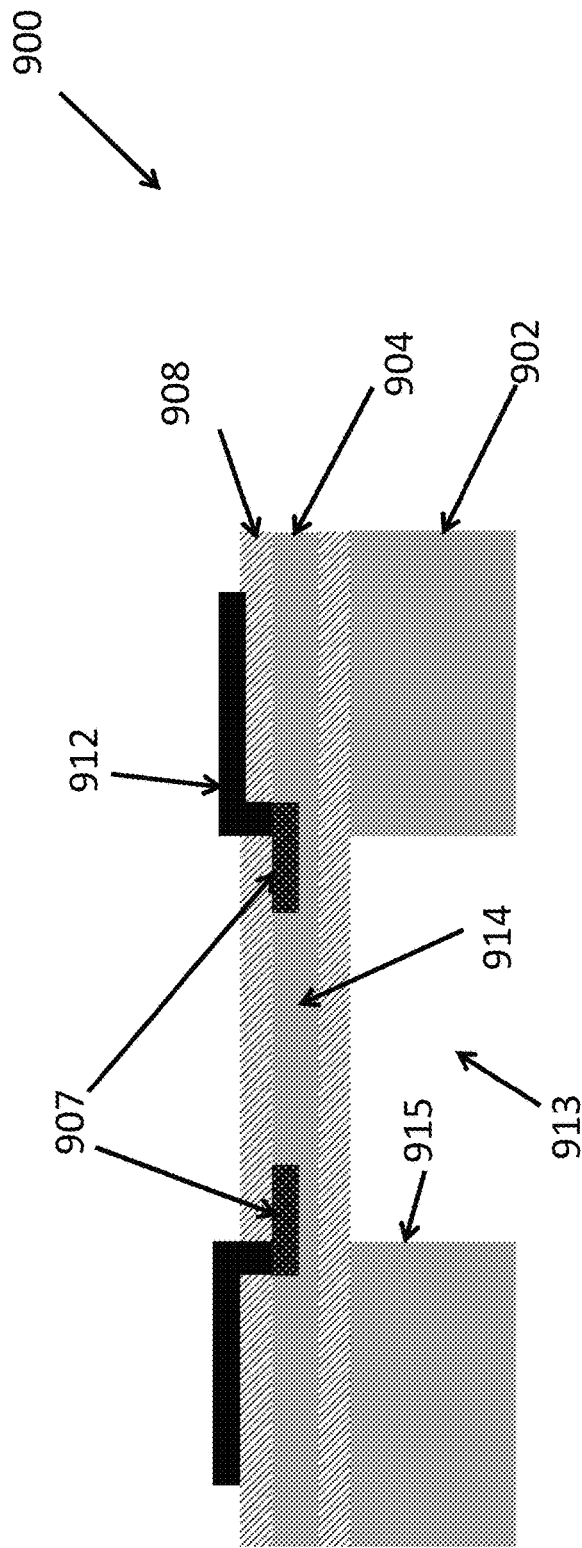
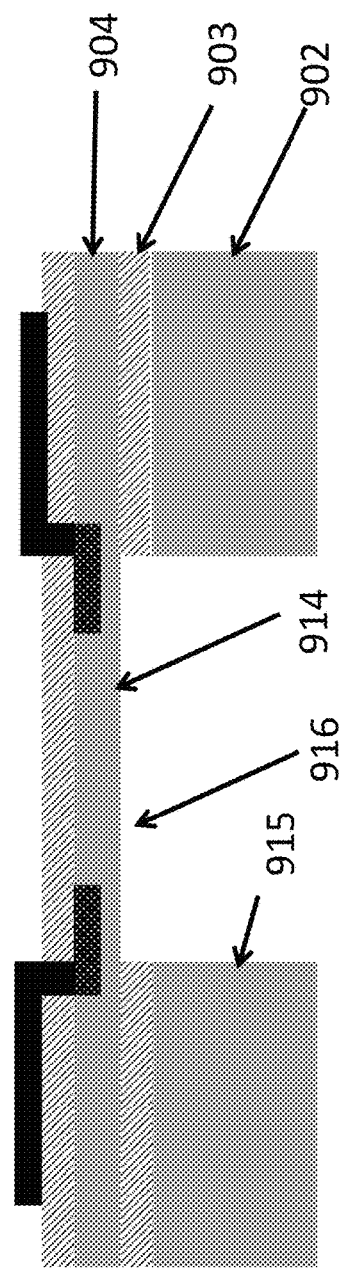
Fig. 9I
Fig. 9J

LOW-COST, HIGH-PERFORMANCE AND HIGHLY CUSTOMIZABLE MICRO-SCALE PRESSURE AND FORCE SENSOR

This invention was made with government support under FA8651-16-C-0258 awarded by the Air Force. The government has certain rights in the invention.

FIELD OF INVENTION

The present invention is directed to micro-scale pressure sensing and force sensing devices that employ piezoresistive sensing mechanisms and methods of fabrication. The present invention discloses a pressure and force sensor that is low in cost, small in size, is highly customizable for its sensing range and sensitivity, and exhibits high performance levels over very large temperature ranges. This present invention has a wide range of applications including medical, industrial control, aerospace, automotive, consumer electronics and products, as well as any application(s) requiring the use of sensors for the measurement and monitoring of pressures or forces.

BACKGROUND

Pressure and force sensors made from single-crystal silicon substrates available in the market are produced using backside etch processes that involve immersion into anisotropic wet etchants such as potassium hydroxide (KaOH), or similar types of etchant solutions, to make thin mechanically-compliant membranes that are used for the pressure sensing.

These types of etchants are anisotropic, that is, they have preferential etch rates depending on the crystal planes of the single-crystal silicon substrate exposed to the etchant solution. This results in sloped sidewall angles of the etched features that consume a considerable amount of die area thereby significantly increasing the cost of the device production. Further, many of these devices and processes also use "etch stop" layers wherein the surface of the semiconductor substrate is highly doped (e.g., $10^{19}$ to $10^{20}$ boron atoms per cubic centimeter) with boron dopants prior to the anisotropic etch in order to control the thickness of the membrane and obtain a relatively uniform membrane thickness. The etch stop mechanism is based on the known phenomena that many anisotropic silicon etchants exhibit a dramatically lower etch rate of highly boron doped silicon material compared to normal background doping levels. This enables the relatively well-controlled thicknesses in the manufacturing of thin membranes needed for the pressure and force sensor implementation. However, highly doping silicon with boron makes the formation of high-performance piezoresistors in the silicon membrane impossible since the doping levels for etch stops are orders of magnitude higher than needed for high-sensitivity piezoresistive elements. Consequently, pressure and force sensors using anisotropic etchants and boron etch stops employ a suitably doped polysilicon material layer deposited onto the membrane and then patterned into the piezoresistive elements. However, polysilicon piezoresistive elements have response sensitivities (defined as the gauge factor as explained below) that are significantly lower than can be obtained in single-crystal silicon.

The high boron doping levels required for etch stops also result in high stresses in the silicon material thereby causing crystallographic damaged slip planes to develop in the silicon material of the membrane that significantly weakens the strength of the membrane material. Further, the highly boron doped etch stops exhibit high stress levels and plastic deformation effects making sensor implementation far more difficult, expensive and unpredictable. The devices made using these etch stops implementation techniques require expensive post-production calibration.

The issues of current design and manufacturing methods of pressure and force sensors 100 are illustrated in FIG. 1, labeled as "Background" in FIG. 1. As shown in FIG. 1, the use of micromachining manufacturing techniques allow the silicon semiconductor substrate 101 to be selectively removed in an area (e.g., features 102) from the backside of the substrate 101 to reduce the mechanical stiffness in the sensing membrane 103 where the sensing elements 104 of the pressure sensor 100 are located, thereby significantly increasing the sensitivity of the pressure sensor 100 to pressure and forces. This is accomplished by using anisotropic wet etchants such as potassium hydroxide (KaOH). Additionally, the piezoresistive sensing elements 104 are made at the edges of the membrane 103 where the strains in the membrane 103 due to deflection are maximized.

Pressure and force sensors 100, such as shown in FIG. 1, use a wet bulk anisotropic etchant to implement the pressure sensing membrane 103. In general, it is very desirable that the thickness of the membrane 103 is well controlled. Using anisotropic wet etchants, the known techniques for control of the membrane 103 thickness are as follows: (a) a timed etch; (b) a heavily doped boron etch stop; and (c) an electrochemical etch stop.

The use of timed etches does not allow good control of the membrane 103 thickness and for that reason is rarely used. The second technique of using an etch stop requires boron doping to form an etch stop at such high levels to make it impossible to implement high quality piezoresistors 104 in this heavily doped material for the membrane 103. This is shown in FIG. 1B wherein the piezoresistive coefficient (a measure of the quality of the piezoresistive effect in silicon is shown as a function of doping of boron for three temperatures. Therefore, when using this technique, deposited polysilicon piezoresistors 104 are often fabricated on the top surface of the membrane 103 instead of making them into the material of the top surface of the membrane 103. However, piezoresistive elements made from polysilicon have gauge factors no more than ⅓ to ½ of that of single crystal silicon, and therefore the pressure or force sensor using this kind of strain sensing elements 104 will have significantly lower sensitivity to either pressure or forces on the membrane. Additionally, depositing, patterning and doping polysilicon sensors onto the membrane 103 adds considerable cost and complexity to the production process. Moreover, the high boron dopant concentration needed to form an effective etch stop creates stresses in the membrane and also weakens the membrane thereby necessitating post-fabrication calibration of the sensor and constrained exposure to pressures and forces.

The electrochemical etch stop method allows lower doping to make the etch stops, and therefore higher quality piezoresistor 104 elements can be implemented in the single crystal silicon membrane. However, the problem with this approach is that electrochemical etch stops require a significant amount of experimentation in order to have a working process, highly specialized equipment, and very complicated manual set-up procedures. Further, electrochemical etch stops often are not very reproducible without an extreme amount of oversight and monitoring thereby dramatically increasing the cost of this method.

All of these wet chemical anisotropic etchant processes for micromachining do not provide excellent control of the resultant dimensions of the membrane 103, both in the thickness of the membrane 103 as well as the lateral dimensions of the membrane 103. The accurate control of the thickness of the membrane 103 using these methods is exceedingly difficult or impossible to achieve in practice due to a number of factors including: dopant diffusions are uncontrollable and unpredictable at very high dopant levels; etch stops are sensitive to many extraneous conditions, such as etchant solution composition, temperature, lighting effects, electrical contact effects, layout pattern effects, etchant additives, etchant age, localized etch rates, etc.; and others. The control of the lateral dimensions of the membrane 103 is largely determined by how well the substrate 101 back side masking layer used for the anisotropic etching is precisely aligned to the crystallographic planes of the single-crystal silicon substrate 101. Any misalignment results in the lateral dimensions to become appreciably larger. This effect is not generally controllable or predictable without greatly complicating the implementation process.

Importantly, all of these methods result in the sloped sidewalls 105 of the etched features 102, which significantly increases die size and cost. The sloped angles of the sidewalls 105 of the etched features 102 result in a large amount of wasted die space and this significantly increases the manufacturing costs.

Pressure and force sensors using anisotropic wet etching methods and etch stops also are not easily customizable to specific application requirements. The commercial market for pressure and force sensors spans an enormous range of pressures, sensitivities, cost levels, operational temperature, etc. Using present design and fabrication methods makes the development of the sensor design and manufacturing processes for each application very expensive and a lengthy development. This is problematic for smaller markets that often make the investments needed to develop new devices for these smaller markets unprofitable.

Additionally, the leakage currents from the piezoresistive elements 104 to the substrate 101 in conventionally made pressure and force sensors tend to radically increase with increasing temperatures thereby limiting the range of temperatures that devices (e.g., force sensor 100) made using these manufacturing methods can be used.

Therefore, there is a need for micro-scale pressure and force sensors that eliminate these problems, such as the use of anisotropic wet etchants and highly-boron doped etch stops. Moreover, there is a need for a pressure and force sensor design and manufacturing process that is extremely flexible, can be rapidly and inexpensively prototyped and transitioned into production so that pressure sensors meeting different application requirements can be developed quickly and at low cost levels. There is also a need for pressure and force sensors that can be used over larger temperature ranges. The sensor of the embodiment of the present invention provides those benefits as well as a high level of pressure (or force) measurement sensitivity.

SUMMARY OF INVENTION

Examples of the present disclosure are directed to micro-scale pressure sensing and force sensing devices that employ piezoresistive sensing mechanisms and methods of fabrication. Example embodiments provide a pressure and force sensor that is low in cost, small in size, exhibits high sensitivity, functions at relatively high temperatures and is extremely customizable for a wide variety of applications without incurring large development and manufacturing costs. Example embodiments have a wide range of applications including medical, industrial control, aerospace, automotive, consumer electronics and products, as well as any application(s) requiring the use of pressure and force sensors for the measurement and monitoring of pressures and forces.

BRIEF DESCRIPTION OF THE DRAWINGS

FIG. 4B illustrates Table I of calculated membrane edge lengths for various membrane thicknesses.

FIG. 4C illustrates Table II of calculated values of the piezoresistive coefficients in silicon for various dopant types and concentration levels.

FIG. 4D illustrates Table III of transverse and longitudinal gauge factors as a function of direction of applied strain and current.

FIGS. 9A-9J illustrate a process sequence for implementation of the pressure or force sensors of an example embodiment.

DETAILED DESCRIPTION OF THE INVENTION

Figure 1A:
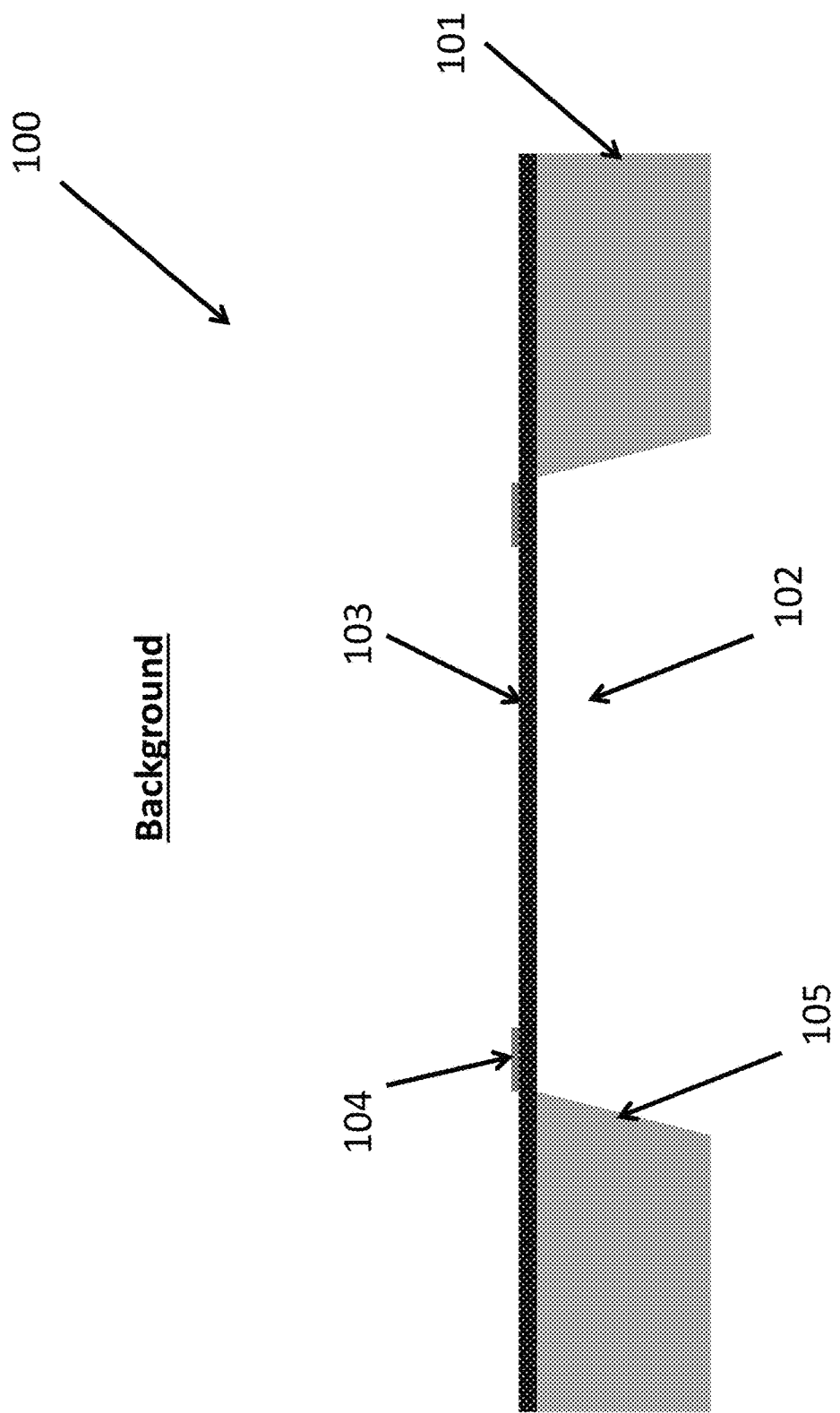
FIG. 1A is a background illustration of the issues involved using current technologies to implement pressure and force sensors.

Examples of the present disclosure are directed to micro-scale pressure sensing and force sensing devices that employ piezoresistive sensing mechanisms and methods of fabrication. The present disclosure provides a pressure and force sensor that is low in cost, small in size, is extremely customizable for sensing range and sensitivity, exhibits high sensitivity and operates at high temperatures. Examples of the present disclosure can have a wide range of applications including medical, industrial control, aerospace, automotive, consumer electronics and products, as well as any application(s) requiring the use of sensors for the measurement and monitoring of pressures or forces.

The pressure (or force) sensor of an example embodiment may have a number of features: it can be configured as a differential, gauge and absolute pressure-type of sensor; it can be used for sensing pressures or forces; it can be used in applications demanding very large dynamic ranges of pressures and forces; it can operate at both very low and high temperatures; it is very robust and can be used in extreme and harsh environments; it has a small die size and therefore a low manufacturing cost, even for small quantity production; the design can be easily revised and customized so as to make devices that can operate over any range of pressures (i.e., from one Pascal or less to billions of Pascals or more) or forces (i.e., from one micro-Newton or less to tens of billions of Newtons or more); it is easy to package and integrate with other components; and it requires no calibration.

Examples of the present disclosure are based on using the piezoresistive effect in semiconductors as the transduction mechanism. A piezoresistive material is one in which the resistance is influenced by applied mechanical strains. This phenomenon is prominent in semiconductors where the strain induces changes in the electronic band structure of the material thereby making the electrical carrier scattering rates dependent on the direction of charge carrier transport. This effect is useful for pressure and force sensors by placing the piezoresistive elements at a position where the strain due to pressure or force loading is exhibited, more preferably where the strain is maximized. With a piezoresistive sensing element the transduction mechanism is a mechanical strain that results in a change in resistance that can be easily measured electrically.

A useful quality factor of piezoresistive materials is the Gauge Factor (GF), which is a dimensionless quantity given by the normalized change in resistance divided by the strain as follows:

$$\text{Gauge Factor (GF)} = \frac{\frac{\Delta R}{R}}{\varepsilon},$$

where $\Delta R$ is the change in resistance (in units of ohms), R is the nominal value of resistance (in units of ohms) and $\varepsilon$ is the strain (dimensionless). The strain for an element of length, L, with a tensile force applied is a dimensionless quantity and is given by $\Delta L/L$. Bulk silicon, depending on crystal orientation, and doping type and level, has a very high gauge factor approaching 200 in some configurations. However, in most situations the gauge factor will be between 120 and 180. In comparison, metal resistors typically have gauge factors of only 2 to 5.

Figure 2:
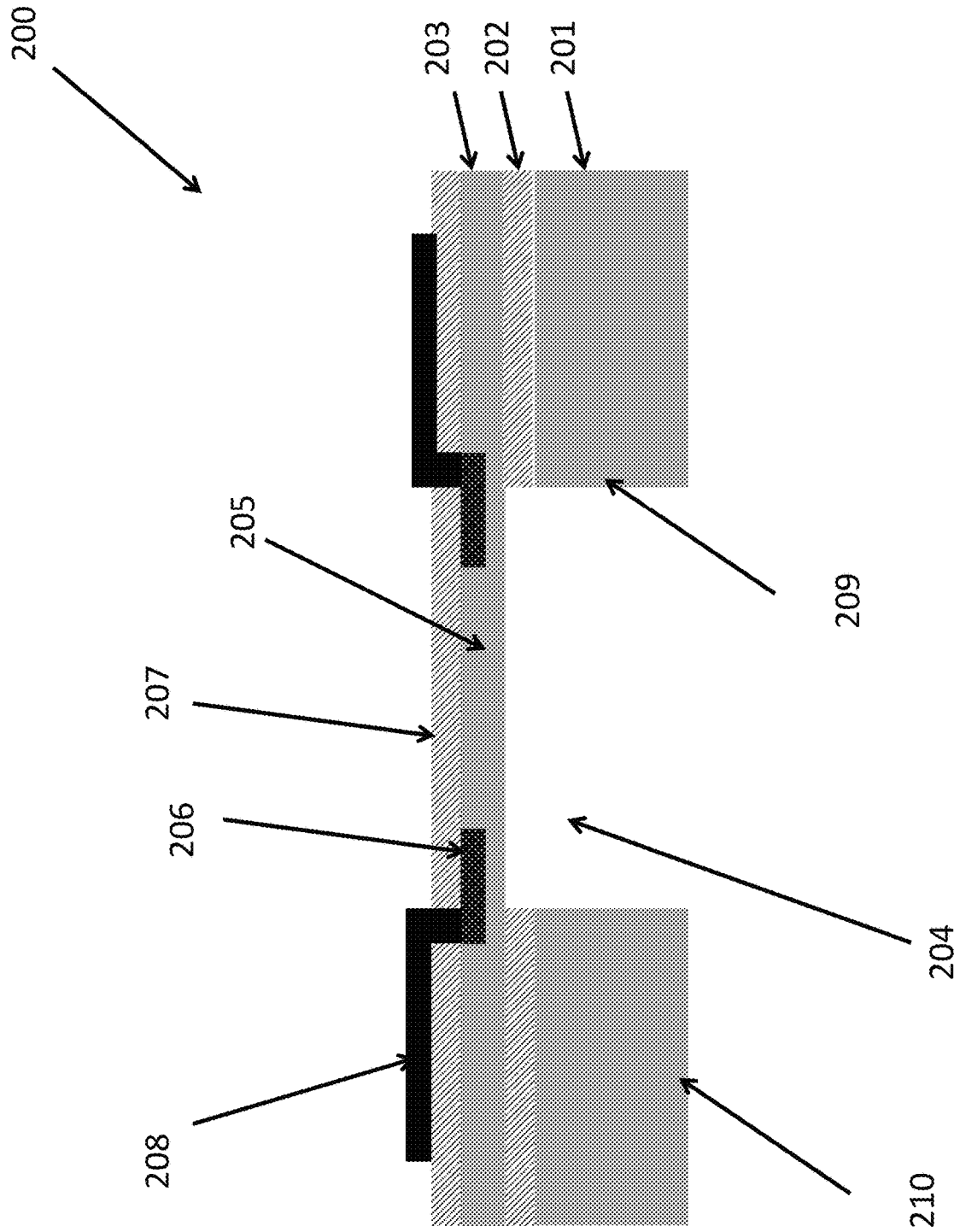
FIG. 2 is a cross section drawing of an example embodiment.

Piezoresistors are employed as strain measurement sensors wherein the resistor (strain sensing element) is fabricated in a mechanically compliant surface or structure such as illustrated in FIG. 2, which is an embodiment 200 illustration of the cross section of a silicon piezoresistive pressure or force sensor according to one embodiment of the present disclosure. It should be noted that this drawing is not to dimensional scale.

The embodiment 200 illustrated in FIG. 2 shows the sensor fabricated using a silicon-on-insulator (SOI) wafer that is composed of a single-crystal silicon handle wafer 201 that can have any thickness suitable for handing and processing, a buried silicon dioxide layer 202, that can be a thickness of a few nanometers or more, and a single-crystal silicon device layer 203 that can be any thickness from a few tens of nanometers to hundreds of microns. More generally, the silicon substrate, buried silicon oxide layer and silicon device layer materials can be substituted for other semiconductor-related materials as further explained below, in which case, the SOI abbreviation stands for "semiconductor-on-insulator."

There are several advantages of using SOI wafers in the examples of the present disclosure, one of which is that SOI wafers are easily customizable thicknesses of the handle, buried oxide and device layers. This important attribute enables the pressure or force sensors to be customized to a wide range of pressures and forces, dynamic ranges of pressures and forces and sensitivities of pressures and forces. Additionally, the presence of the buried oxide layer 202 provides a means for an etch stop for removing the backside of the substrate 204 in the area where the membrane 205 is formed (this will be explained in more detail later). Additionally, the single-crystal silicon device layer 203 has low doping and therefore can be used to make high gauge factor and thereby higher sensitivity piezoresistive elements 206. This enables pressure and force sensors to be realized also with higher sensitivity levels.

The embodiment 200 of the sensor device made using a SOI wafer, has a section of the backside area of the handle wafer 201 removed (removed portion of the backside of the substrate 204) to form a mechanically-compliant membrane 205 composed of the device layer 203. In the present context, "mechanically-compliant" is defined as a structural element of the device that deflects under a pressure or force loading while other parts of the device (i.e., the substrate surrounding the membrane that has not been thinned) does not appreciably defect.

The device layer 203 is single-crystal silicon and also has a moderate to low background doping concentration. The importance of this is that the low background doping of the silicon membrane 205 allows significant flexibility in customizing the dopant levels of the piezoresistive elements 206. As shown in FIG. 2, the buried oxide layer 202 has also been removed from the area on the backside of the membrane 205. Alternatively, the buried oxide layer 202 could be left in place on the backside of the membrane 205 to provide some additional design flexibility in stiffening the mechanical behavior of the resultant sensing membrane 205, adjusting the stress level in the membrane 205, and providing a chemically protective layer on the backside of the membrane 205 for certain harsh environment applications.

An electrically insulating layer 207 is formed on the top-side of the membrane 205. This electrically insulating material layer 207 can be composed of any material or material system that is electrically insulating including: silicon dioxide, silicon nitride, oxy-silicon nitride, aluminum oxide, and others. The choice of this insulating material or material system layer 207 is based on its electrical insulating properties, as well as its ability to adjust the mechanical stiffness of the membrane 205, its ability to adjust the stress level in the membrane 205, and/or its ability to provide chemical protection to the membrane 205. In most instances, this electrically insulating layer 207 will be made very thin, such as tens to hundreds of nanometers in thickness so that its effect on the mechanical stiffness and stress of the membrane 205 will be minimal.

The piezoresistive elements 206 are formed into the single-crystal silicon device layer 203 of the SOI wafer near the edges of the membrane 205. This is where the strain is maximized in the membrane 205 when pressures or forces are applied to the membrane 205 to cause it to deflect. Since the device layer 203 is composed of single-crystal silicon that can have a low background dopant concentration, this eliminates the problem faced in conventionally made pressure and force sensors using highly-doped etch stop layers that have such a high doping level to prevent high quality piezoresistive elements 206 to be implemented in the membrane 205. Further, since the background doping of the membrane 205 can be low, this affords enormous flexibility to precisely adjust the doping level of the piezoresistive elements 206 for practically any application.

Electrical interconnects 208 that make ohmic contact to the piezoresistive elements 206 are implemented using a material or material system that has low electrical resistivity, is known to make ohmic contacts to single-crystal silicon, can be patterned into a desirable electrical wiring configuration, and has electrical, chemical and mechanical stability and reliability for the intended application. A number of suitable materials and material systems can be used for these electrical interconnects 208 including: gold, doped polysilicon, aluminum, aluminum-silicon, copper, refractory metals, conductive ceramics, and silicides.

Figure 1B:
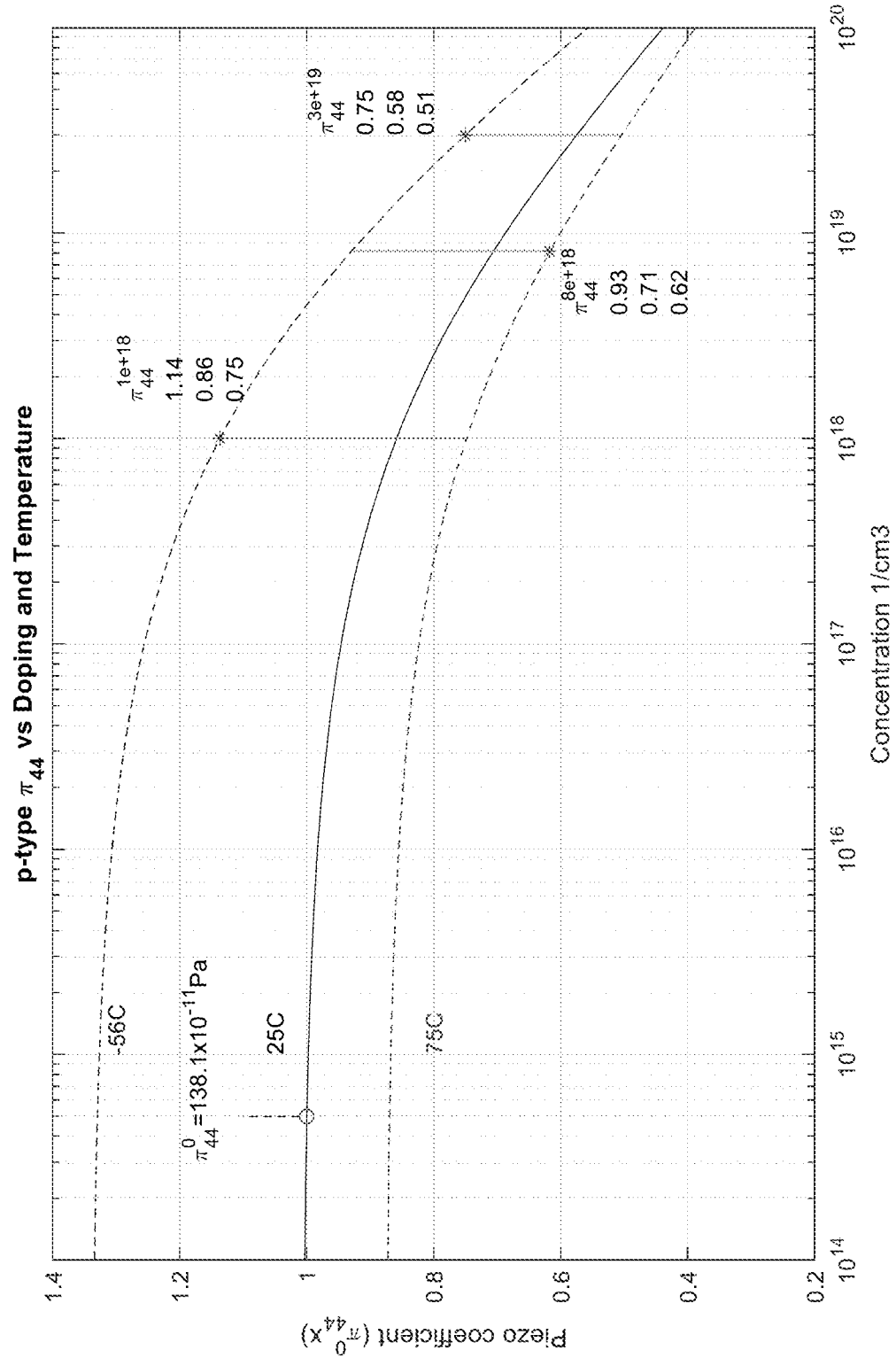
FIG. 1B is a graph showing how the piezoresistive coefficient decreases with the dopant concentration of boron in silicon.

Importantly, the membrane 205 for the sensor device 200 is implemented with an etching method wherein the sidewalls 209 of the etched region 204 that is used to remove a portion of the handle wafer 201 has vertical sidewalls. This is unlike the conventional sensors as shown in FIG. 1 wherein the sidewalls have a sloping angle (see FIG. 1, 105). This reason that is beneficial is that far less area is needed to implement the sensor since device area is not wasted on the sloping sidewalls. Instead, the area 210 around the membrane 205 of the device shown in FIG. 2 can be greatly reduced thereby resulting in a lower per die cost. Using this design and fabrication method allows the per die cost to be reduced to below $0.50 or even $0.25 or lower depending on the thickness of the layers in the SOI wafer.

Figure 3:
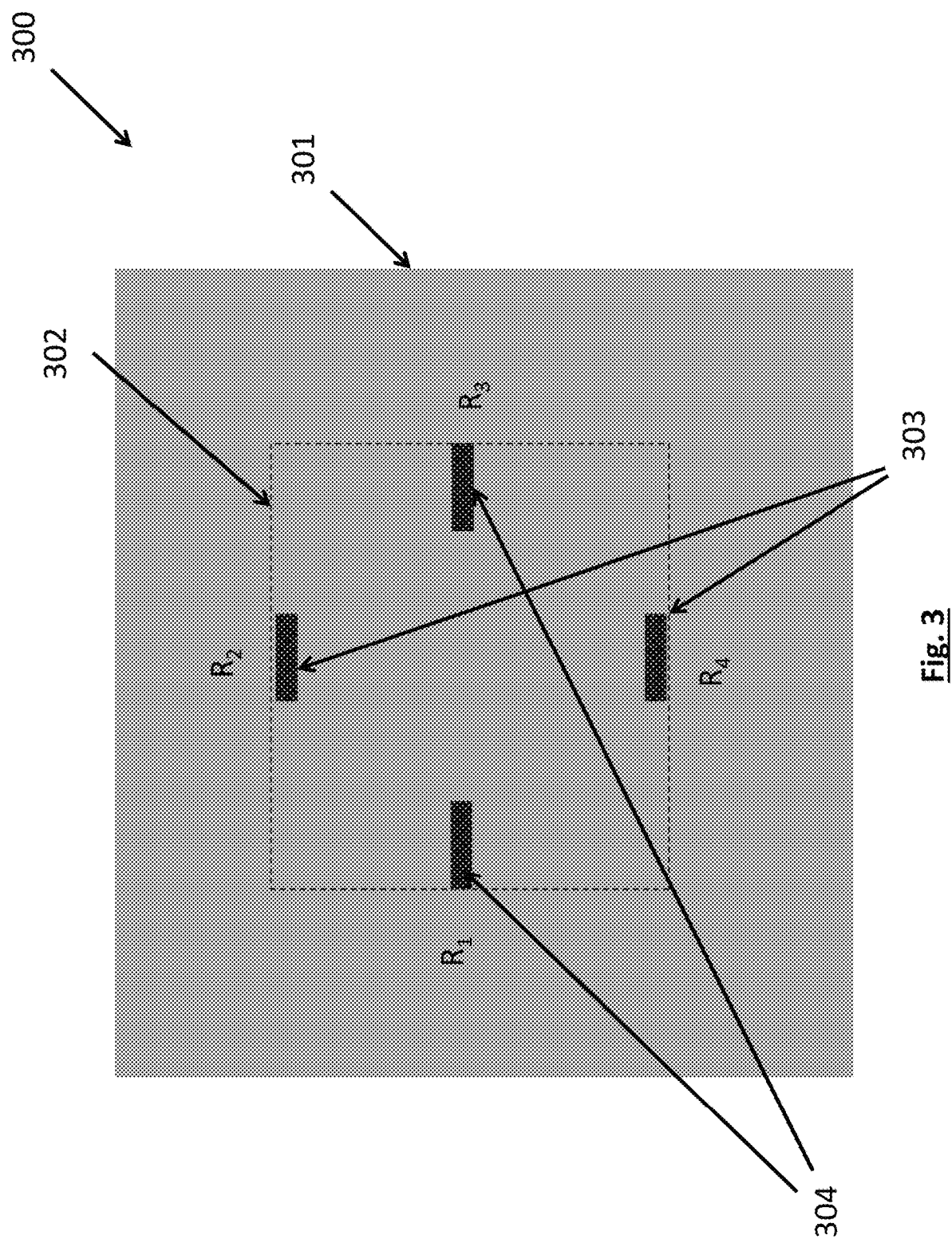
FIG. 3 is a plan view drawing of an example embodiment.

A plan view of the embodiment 300 of the pressure or force sensor is illustrated in FIG. 3, according to one embodiment of the present disclosure. Shown in FIG. 3 is the plan view of a sensor die 301. This view is from the top of the sensor die 301. As before, this drawing is not to dimensional scale. The mechanically compliant sensing membrane 302 cannot be seen from this angle since it is implemented on the backside of the sensor die 301 and its location is shown by a dotted line to indicate its approximate position on the sensor die 301. There are shown four (4) piezoresistive elements 303 and 304, labeled $R_1$, $R_2$, $R_3$, and $R_4$. As shown, two of these piezoresistive elements 304, labeled $R_1$ and $R_3$, are each positioned orthogonally on opposite sides of the membrane 302, with each approximately at a mid point of one of the edges of the membrane 302, such that their full extent is located on the membrane 302. The other two piezoresistive elements 303, namely $R_2$ and $R_4$, are each positioned parallel to the other two opposite sides of the membrane 302, with each at the mid point of one the edges of the membrane 302, such that their full extent is located on the membrane 302. This positioning of the piezoresistive elements 303 and 304 is where the strain in the membrane 302 is maximized when the membrane 302 undergoes deflection based on an applied pressure or force. The reason for positioning two of the piezoresistive elements 304 orthogonal to the membrane 302 and the other two piezoresistive elements 303 parallel to the membrane is so that two of the piezoresistive elements 304 will exhibit a increase in resistance value upon application of a strain, and the other two piezoresistive elements 303 will exhibit a decrease in resistance value upon application of a strain. This is useful for the readout circuitry as explained below.

Figure 4A:
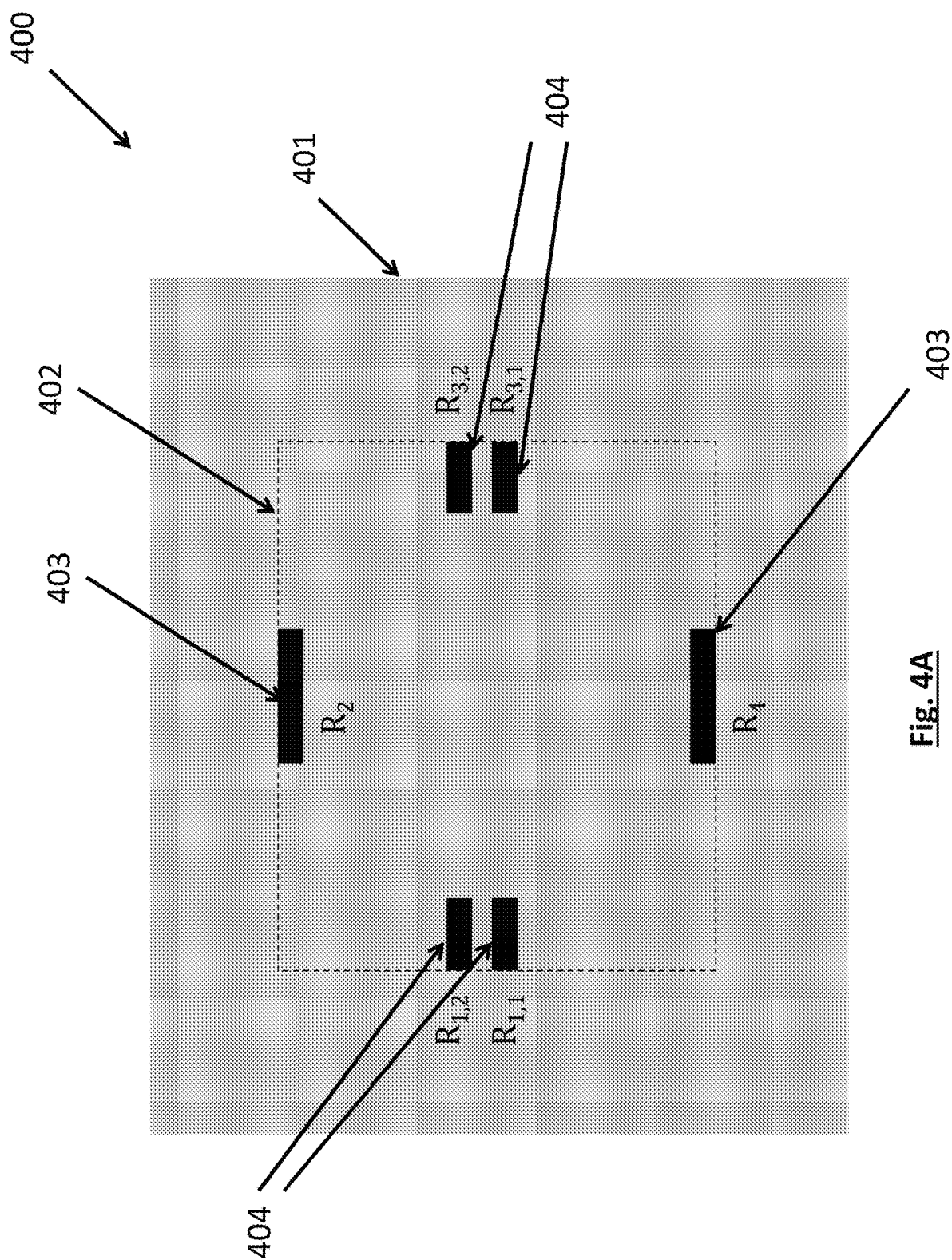
FIG. 4A is a plan view drawing of an example embodiment using a different configuration of the piezoresistive sensing elements.

While the layout configuration shown in FIG. 3 is useful, an alternative design configuration having specific advantages is shown in FIG. 4A.

FIG. 4A is a plan view an alternative embodiment configuration of piezoresistive elements from the top of the die 401. As before, this drawing is not to dimensional scale. The location of the backside membrane 402 is shown as a dotted line. In this embodiment 400, the piezoresistive elements 403 labeled, $R_2$ and $R_4$, are positioned the same as in FIG. 3, such that they are parallel on opposite sides of the membrane 402, each at a mid point of one of the edges of the membrane 402. However, the piezoresistive elements 404, labeled, $R_{1,1}$ and $R_{1,2}$, are doubled up and positioned orthogonally on the other two opposite sides of the membrane 402, with the center of the two piezoresistive elements 404 each located at the mid point of the membrane 402 edge. As before, the full extent of the piezoresistive elements 403 and 404 is on the membrane 402. Usually the doubled up piezoresistive elements 404 are electrically interconnected to be in a series configuration to maximize their sensitivity. However, in some applications is may be preferable to electrically connect them in a parallel configuration. The reason for doubling up these piezoresistive elements 404 that are orthogonal to the membrane 402 is to increase their gauge response (i.e., sensitivity) so that it is approximately equal to those of the piezoresistive elements 403 configured parallel to the edge of the membrane 402.

There are several advantages with the piezoresistive element 403 and 404 configuration in FIG. 4A when connected into a Wheatstone bridge circuit. First, it slightly increases the pressure sensitivity by over 5%. Second, it reduces the non-linearity over temperature by almost 1%. Third, it enables a more linear response. And, fourth, it results in a more balanced bridge response including obtaining a zero output voltage under the no applied strain condition.

The membrane 205 of the sensor shown in FIG. 2 will deflect under a uniform differential pressure or force loading. The deflection of the membrane will be a maximum at the center of the membrane and is given by:

$$y_{max} = \frac{\alpha q b^4}{E t^3},$$

where $\alpha$ is a constant that is equal to 0.0138 for a square membrane 205, q is the uniform loading (Pascals or Newtons/meters$^2$), b is the edge length of the membrane 205, E is Young's modulus of silicon (assumed to be equal to 160 GPa), and t is the thickness of the membrane 205. This equation assumes small deflection loading of the membrane 205, which is valid over a range of deflections up to about ½ of the membrane 205 thickness.

Additionally, the maximum stress of the membrane 205 is at the membrane 205 edges and is given by:

$$\sigma_{max} = -\frac{\beta_1 q b^2}{t^2},$$

where $\beta_1$ is a constant equal to 0.3078 for a square membrane 205. Further, the stress and strain are related through the expression:

$$E = \frac{\sigma}{\varepsilon}.$$

For example, if we assume that the maximum deflection is limited to ½ of the thickness, and the pressure loading at full scale is 7 psi, or 48,263 Pascals, and substituting in the values of $\alpha$, E and q, the equation for the maximum deflection can be rewritten as:

$$120 \times 10^6 t^4 = b^4.$$

Other expressions can be developed for other applied pressures over the membrane 205 area. Additionally, these expressions can be translated into forces by simply multiplying the pressure applied by the area of the membrane 205.

It is desirable that the membrane 205 deflection be as manufacturing reproducible as possible in order to have reproducible sensor (e.g., embodiment 200) performance. The lateral dimensions of the membrane 205 are set by the photolithography performed on the substrate (e.g., wafer 201) backside masking layer and the Deep Reactive-Ion Etching (DRIE) etch as explained below in the section explaining the sensor manufacturing process. These dimensions are reproducible to within a few microns or better. Another reproducibility issue is the alignment of the membrane 205 to the piezoresistive elements 206. This alignment is performed front-to-back through the wafer 201 and therefore will also have a tolerance of a few microns or better. Since the lateral dimensions of the membrane 205 are expected to be several millimeters, the resultant relative tolerance of these features will be below 1% tolerance. This is important since the membrane 205 maximum stress and strain under applied uniform loading is proportional to the squared power to the membrane 205 edge length. Therefore, this amount of tolerance in the membrane 205 strain will be below 2%.

The tolerance of the thickness of the membrane 205 is also important. The maximum stress under uniform loading in the membrane 205 is proportional to one over the squared power of the thickness. Since the thickness of the membrane 205 will be in the range of a few microns to tens of microns, any significant variation in the thickness will have a large impact on the membrane 205 maximum stress. Importantly, the device layer 203 of the SOI wafer is what determines the membrane 205 thickness variation, and therefore it will be desired that this dimension be controlled with as small a variation as possible. SOI wafers can be made with thickness variations of +/−0.25 microns or less. This is a significant advantage of the present disclosure compared to other approaches.

From the equation above, there is a relationship between the membrane 205 thickness and membrane 205 edge lengths, and this will limit how thick the membrane 205 can be without having a very large die size. Assuming a 20-micron device layer 203 thickness, the relative variation will be +/−1.25%, which is a reasonable tolerance. This would require that the membrane 205 edge length be 2.09 mm. A 50-micron thick membrane 205 would have a variation of +/−0.5% and would have a membrane 205 edge length of 5.23 mm. Table I shows a range of thicknesses, the resultant relative variation of the thickness and the calculated membrane 205 edge lengths.

Since silicon is an anisotropic material, Ohm's law in matrix form is written as follows:

$$\begin{pmatrix} E_x \\ E_y \\ E_z \end{pmatrix} = \begin{bmatrix} \rho_1 & \rho_6 & \rho_5 \\ \rho_6 & \rho_2 & \rho_4 \\ \rho_5 & \rho_4 & \rho_3 \end{bmatrix} \begin{pmatrix} i_x \\ i_y \\ i_z \end{pmatrix}.$$

Where the $E_i$ are the electric field vectors, $\rho_i$s are the piezoresistivity tensor values and $i_j$s are the current density vectors. Using the stress-strain tensor and substituting, this can be re-writtened as:

$$\begin{pmatrix} \Delta\rho_1/\rho_0 \\ \Delta\rho_2/\rho_0 \\ \Delta\rho_3/\rho_0 \\ \Delta\rho_4/\rho_0 \\ \Delta\rho_5/\rho_0 \\ \Delta\rho_6/\rho_0 \end{pmatrix} = [\pi][T] = \begin{bmatrix} \pi_{11} & \pi_{12} & \pi_{12} & 0 & 0 & 0 \\ \pi_{12} & \pi_{11} & \pi_{12} & 0 & 0 & 0 \\ \pi_{12} & \pi_{12} & \pi_{11} & 0 & 0 & 0 \\ 0 & 0 & 0 & \pi_{44} & 0 & 0 \\ 0 & 0 & 0 & 0 & \pi_{44} & 0 \\ 0 & 0 & 0 & 0 & 0 & \pi_{44} \end{bmatrix} \begin{pmatrix} T_1 \\ T_2 \\ T_3 \\ T_4 \\ T_5 \\ T_6 \end{pmatrix},$$

where the $\Delta\rho_i/\rho_o$ values are the normalized resistivities along the direction crystal directions, the $\pi_{ij}$ values are the piezoresistive coefficients, and the $T_i$ values are the stress tensors.

The piezoresistive coefficients 206 will depend on the dopant type, dopant density, dopant profile, and other factors. Some of the calculated values of the piezoresistive coefficients are given in Table II. As can be seen, the highest gauge factor is generally found in p-type doped silicon devices.

Additionally, which piezoresistive coefficients are relevant in a given sensor design also depend on the orientation of the piezoresistive elements 206 with respect to the crystallographic planes of the silicon device layer 203, and the orientations of the applied voltage and current. Some of the piezoresistive coefficients relevant to the direction of strain and current are given in Table III.

Assuming that the applied stresses are constant over the gauges, the change in resistance normalized to the resistance value is given by:

$$\frac{\Delta R}{R} = \sigma_l \pi_l + \sigma_t \pi_t,$$

where the subscripts l and t refer to the longitudinal and transverse directions respectively. From Tables II and III, we can see that for a p-type piezoresistive element only $\pi_{44}$ is important and assuming the piezoresistive elements 206 are positioned on the <110> planes of a (100) oriented wafer, we can write:

$$\frac{\Delta R}{R} = \frac{\pi_{44}}{2}(\sigma_l - \sigma_t).$$

This equation is applicable to having the piezoresistive elements 303 and 304 being positioned on the membrane 302 as shown in FIG. 3.

Figure 5:
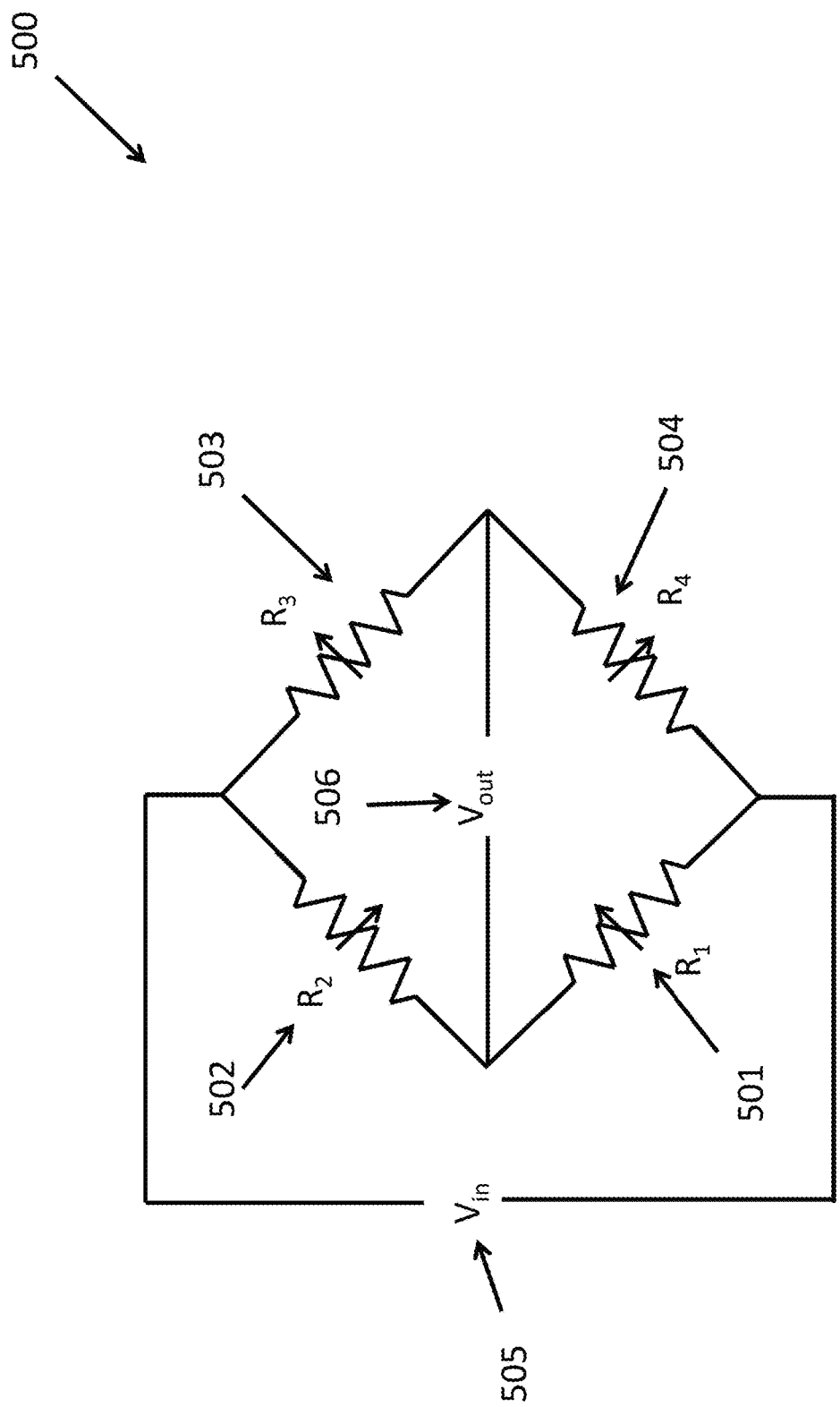
FIG. 5 is a drawing of the piezoresistive elements arranged into a Wheatstone bridge circuit.

To maximize the sensor response, the piezoresistive elements 501 through 504 are wired into a Wheatstone bridge circuit 500 configuration as shown in FIG. 5. Preferably all of the piezoresistive elements 501 through 504 have an equal value to balance the bridge with no strain applied (i.e., $V_{out}$ 506 equal to zero Volts). The direction of the change in resistance of the piezoresistive elements 501 through 504 are shown by the superimposed arrows. This configuration allows the resistance changes in two piezoresistive elements in the bridge to be opposite of the other two piezoresistive elements. This is enabled by having two of the piezoresistive elements, $R_1$ 501 and $R_3$ 503, placed perpendicular to the membrane edges and thereby undergo a longitudinal stress when the membrane is deflected, while the other two piezoresistive elements, $R_2$ 502 and $R_4$ 504, are placed parallel to the membrane edges and undergo a lateral stress. The parallel piezoresistive elements, $R_2$ 502 and $R_4$ 504, will decrease in resistance as the membrane is deflected while the longitudinal piezoresistive elements, $R_1$ 501 and $R_3$ 503, will increase in resistance. If the piezoresistive elements 501 through 504 are positioned correctly and matched in value, the bridge has a zero-output voltage $V_{out}$ 506 when the membrane is not under applied pressure or force loading.

An input bias voltage 505, labeled Vin, provides the electrical power to activate the Wheatstone bridge circuit 500. And the output voltage 506, labeled $V_{out}$, indicates an output voltage 506 that is indicative of the varying piezoresistive element values $R_1$ 501 thru $R_4$ 504 in the bridge circuit 500, which is indicative of the strain applied. The bridge circuit 500 is configured initially with no strain applied such that the $V_{out}$ 506 is zero.

The piezoresistive elements, $R_1$ and $R_3$, undergo a longitudinal stress, $\sigma_l$, and a transverse stress given by $\nu\sigma_\lambda$. The ratio of $\Delta R$ to $R$ for these gauges can be written as:

$$\frac{\Delta R_1}{R_1} = \frac{\Delta R_3}{R_3} = \pi_l \sigma_l + \pi_t \nu \sigma_l = \sigma_l(67.6 \times 10^{-11} Pa^{-1}),$$

where $\nu$ is Poisson's ratio in the [110] direction and equal to 0.064. A similar relationship can be written for the other two gauges as follows:

$$\frac{\Delta R_2}{R_2} = \frac{\Delta R_4}{R_4} = \nu \pi_l \sigma_l + \pi_t \sigma_l = \sigma_l(-61.7 \times 10^{-11} Pa^{-1}).$$

The output voltage 506 of the Wheatstone bridge circuit 500 as a function of the input bias voltage 505 and the piezoresistive coefficients and stress, can be written as:

$$V_{out} = V_{in}\left[\frac{R_1 R_3 - R_2 R_4}{(R_1 + R_2)(R_3 + R_4)}\right] \approx \frac{(\alpha_1 + \alpha_2)}{2(1 + \alpha_1 - \alpha_2)},$$

where:

$\alpha_1 = (\pi_l + \nu\pi_t)\sigma_l$, and $\alpha_2 = (\nu\pi_l + \pi_t)\sigma_l$.

As an illustrative example, assuming the piezoresistive elements 501 through 504 are positioned on the membrane as in FIG. 3 and configured into a Wheatstone bridge circuit as in FIG. 5, the longitudinal stress can be calculated for a 20-micron thick membrane having an edge length of 2.09 mm and an applied pressure of 48,263 Pa as 162 MPs. Substituting into the relationship above we can then write:

$V_{out} = V_{in}(0.045)$.

If the input voltage is 10 V, then the maximum output voltage when the pressure loading is 7 psi will be 0.45 Volt. The pressure sensitivity, S, is defined as the relative change in the output voltage per unit of applied pressure, or:

$$S = \frac{\Delta V}{\Delta P} \frac{1}{V_{in}}.$$

Substituting the values into this relationship, we find that the pressure sensitivity is as follows:

$S = 9.33 \times 10^{-8}$ V/Pa-V, or 9.33 mV/Bar-V.

This represents a very high value of pressure sensitivity for a pressure sensor application. Other values of even higher sensitivity can be easily obtained with appropriate changes in the device dimensions (see below). For the sensitivity for a force sensing application, the pressure is merely multiplied by the area of the membrane of the sensor.

As a representative example using the piezoresistive element 501 through 504 configuration of FIG. 4A and using selected dimensional values of the parallel piezoresistive elements 501 through 504 being 100 microns long, by 10 microns wide, and the transverse resistors being each 50 microns long and 10 microns wide, it can be found that the estimated pressure sensitivity is about 36 mV/psi, the non-linearity is 0.24%, and the temperature coefficient of pressure sensitivity is 82 micro-V/psi-degree C.

Figure 6:
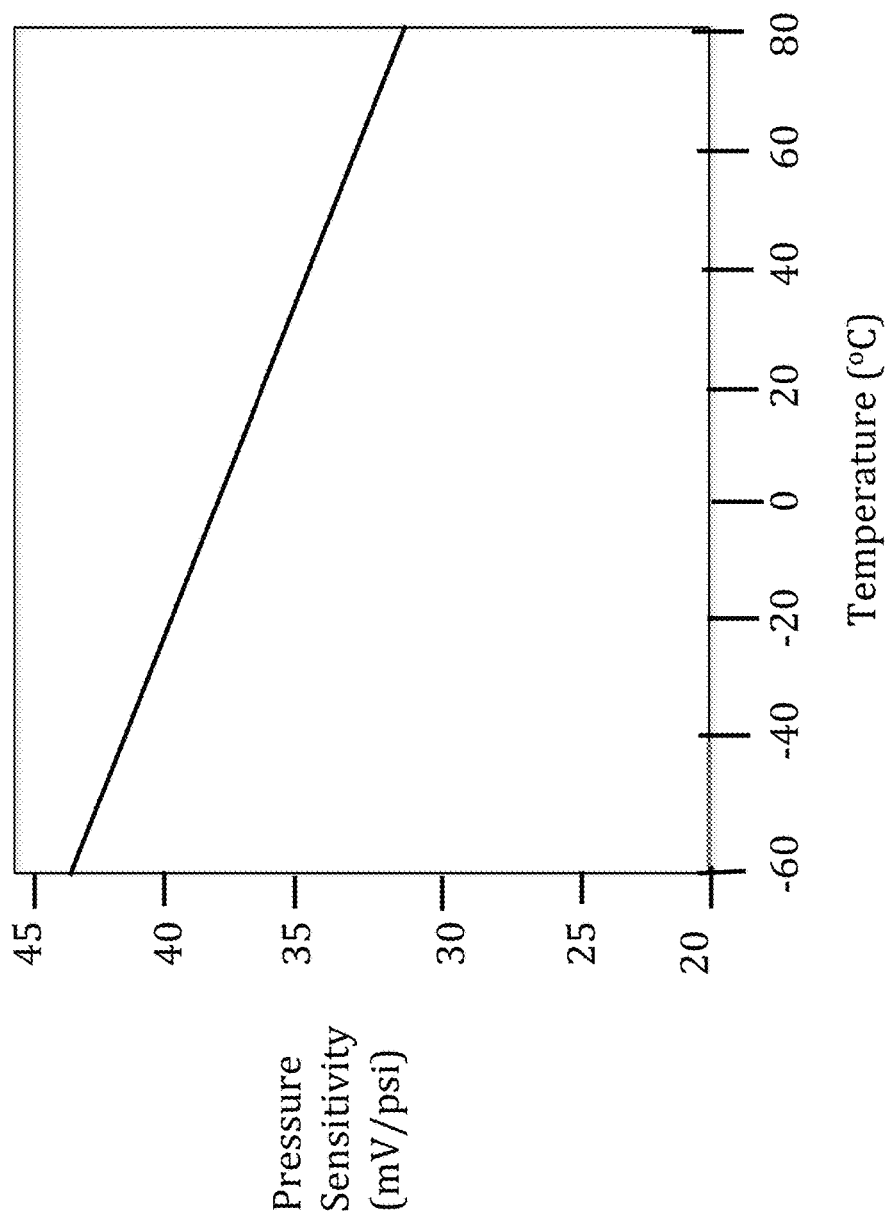
FIG. 6 is a plot of the pressure sensitivity versus temperature for the pressure or force sensor.

The pressure sensitivity as a function of temperature for this configuration 600 and values is plotted in FIG. 6. It is noted that the pressure sensitivity decreases with temperature. This is due to the material property of piezoresistivity whereby the temperature coefficient of piezoresistivity is negative.

Another important consideration is the sensitivity of the sensor manufacturing process to fabrication variations that are inherent in any production process (this is in addition to the membrane thickness variations discussed previously). These fabrication variations include variations in the piezoresistive element dimensions across the substrates (i.e., across wafer dimensional variations) and the variations in the dimensions from substrate-to-substrate (i.e., across batch variations). In general, an increase in the size of the piezoresistive elements will reduce the amount of variations, but reduces the pressure sensitivity. This reduction is due to the fact that the stress is averaged over a larger sized piezoresistive element, whereas smaller dimensioned piezoresistive elements will increase the pressure sensitivity, but at the expense of increasing the process variations. Most pressure sensors are currently made using contact photolithography, which has a typical fixed amount of dimensional variation of +/−0.5 microns. This means that if the width (the smallest dimension of the resistor elements) were 10 microns, the amount of variation due to processing in these elements would be +/−5%. This would result in an outset in the output voltage of the bridge circuit on the sensor of a substantial amount. Therefore, a better solution is to use a new direct-write laser photolithography capability. This can write dimensions below 1 micron with a higher tolerance than direct contact lithography.

In direct-write laser photolithography a substrate having a pre-deposited layer of photoresist is scanned using a computer-controlled laser beam to expose the resist according to a pre-defined mask pattern. Since the laser is electronically controlled, the need for a photomask plate is eliminated. Instead, a computer file with the mask pattern directly controls the laser scanning. Some of these systems are able to write features having a size of 0.2 microns, on an address grid as small as 5 nm, a write speed of 3 mm²/minute, an edge roughness at 3σ of 50 nm, a critical dimension uniformity at 3σ of 60 nm, and a layer-to-layer alignment accuracy at 3σ of 100 nm. These systems can be used to make patterns directly onto the substrate and make masks for use in conventional photolithography.

If it were assumed the piezoresistor element width dimension of 10 microns, and a conservative value of total dimensional variation of 100 nm the expected variation in device widths would be 1% or better. This is marked improvement compared to the use of contact lithography which is used almost exclusively in pressure and force sensor manufacturing.

One of the issues with piezoresistive sensors is the temperature sensitivity of the piezoresistive elements. Therefore, the usual practice is to incorporate some type of temperature compensation capability either in the sensor design and/or the circuit to bias and readout the sensor output response.

A value of sheet resistance for the piezoresistors having the most linear temperature coefficient with change in resistance is about 200 ohms/square.

Figure 7:
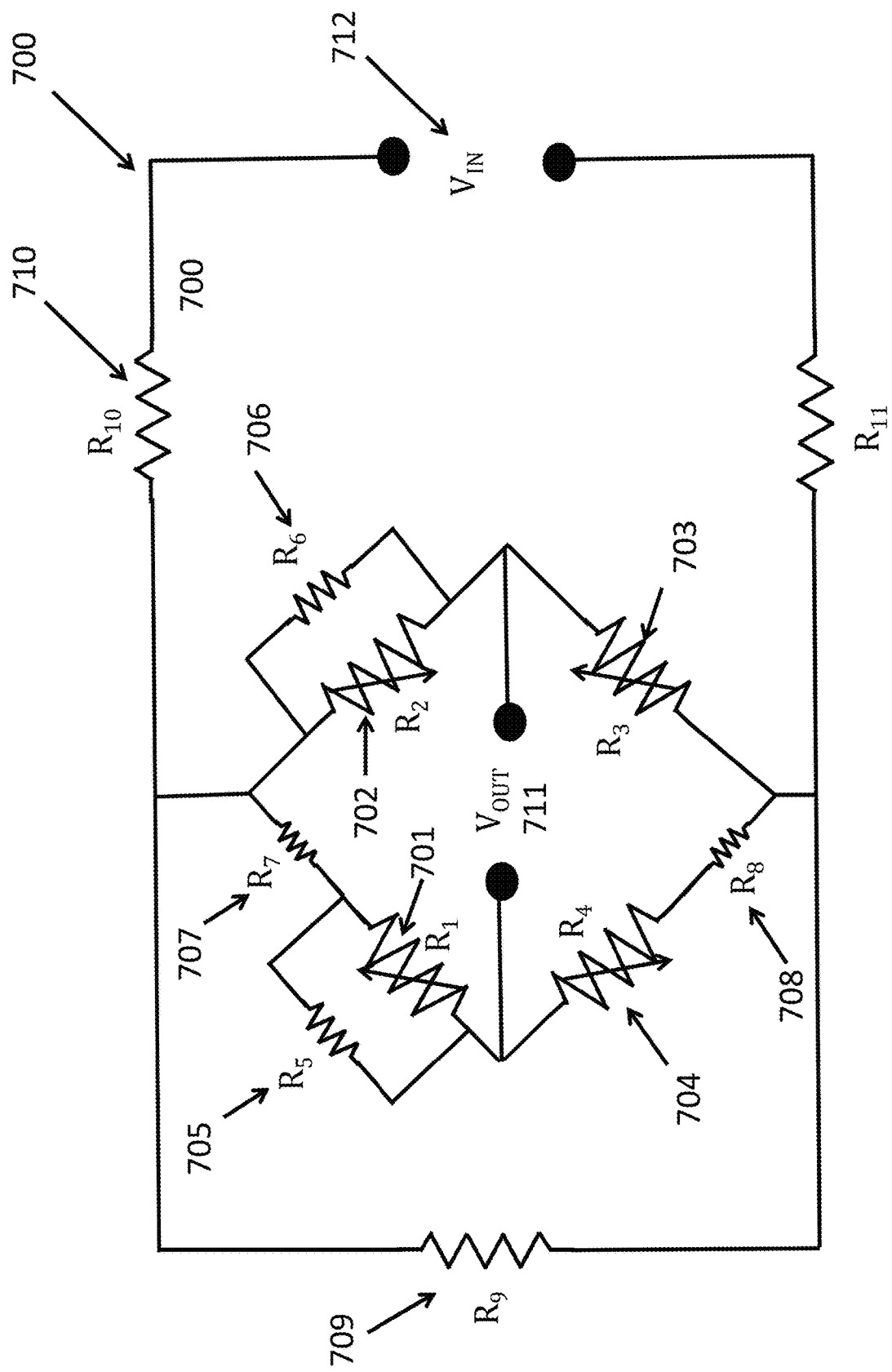
FIG. 7 is an improved circuit design to bias and balance the legs in the bridge circuit configuration to provide a zero output voltage when the piezoresistive elements are unstrained, as well as provide for improved temperature sensitivity and linearity.

An example embodiment of circuit 700 that serves to properly bias and balance the Wheatstone bridge piezoresistor circuit is shown in FIG. 7. This circuit 700 also provides other important functions as well. For instance, it allows temperature compensation of the piezoresistive elements, $R_1$ 701, $R_2$ 702, $R_3$ 703, and $R_4$ 704 in the bridge circuit 700 and it also allows the bridge circuit to be balanced for a zero-offset voltage $V_{out}$ 711. The resistors $R_7$ 707 and $R_8$ 708 are external to the bridge circuit and are in series to the bridge piezoresistors $R_1$ 701 and $R_4$ 704, respectively. They both also have near zero temperature coefficient of resistance and are not placed on the pressure sensor membrane. Moreover, these resistors $R_7$ 707 and $R_8$ 708 are made from a metal having a low TCR, such as nichrome. These resistors $R_5$ 705 and $R_6$ 706 may be made into a series ladder wherein the values can be adjusted using laser trimming techniques to adjust for zero offset voltage $V_{out}$ 711.

The series $R_7$ 707 and $R_8$ 708 and shunt resistors $R_7$ 707 and $R_8$ 708 in each arm will affect the offset output voltage $V_{out}$ 711 of the bridge in opposite directions while also affecting the temperature coefficient of sensitivity expressed as a fractional or percentage change of sensitivity versus temperature (TCVo) in units of %/C in the same direction. A unique combination of series $R_7$ 707 and $R_8$ 708 and shunt $R_7$ 707 and $R_8$ 708 resistors in each arm exists that will both compensate TCVo and allow $V_{out}$ 711 to be zero at room temperature and zero applied strain. The normalization of sensitivity and compensation of the temperature coefficient of sensitivity can be obtained using a constant voltage compensation circuit 700. The series resistor $R_{10}$ 710 sets the sensitivity and provides a near-constant current to the bridge. Since the temperature coefficient of sensitivity is negative, the excitation voltage that increases the temperature compensates the negative decrease in sensitivity. The positive coefficient of resistance causes the bridge input resistance to increase with temperature. Using a constant current source composed of $R_9$ 709 and $R_{10}$ 710 along with constant input voltage $V_{in}$ 712, the bridge voltage $V_{out}$ 711 increases in proportion to the temperature. Using a proper choice of the series resistor $R_{10}$ 710, the effect of the circuit 700 induced output voltage increase $V_{out}$ 711 can be made equal and opposite to the decrease in sensitivity.

Figure 8:
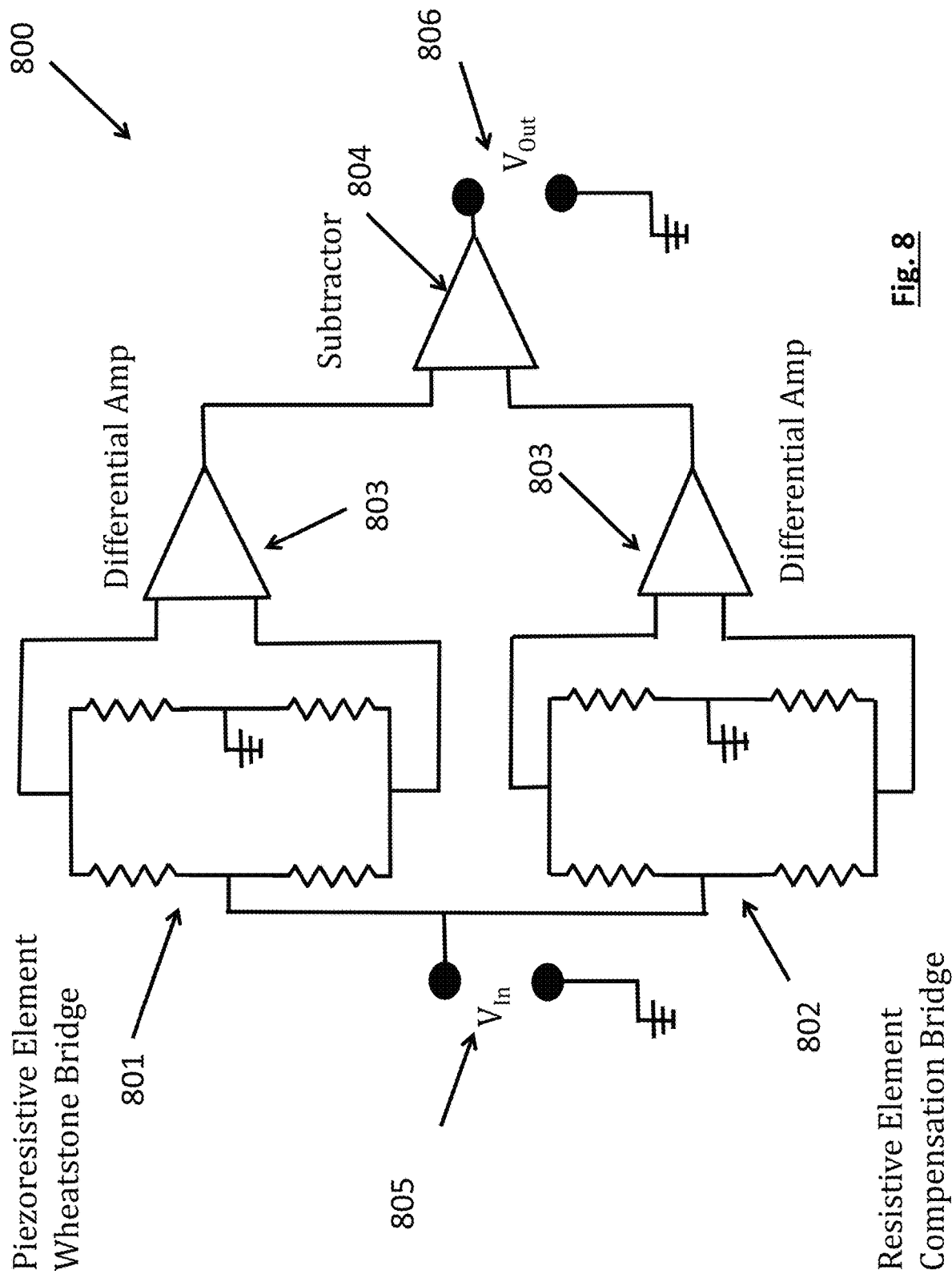
FIG. 8 is a further improved circuit design to compensate for temperature sensitivity of the piezoresistive elements, as well as provide for a one-sided analog output signal that can converted into a digital signal for further signal processing.

A circuit 800 that provides even better temperature compensation is shown in FIG. 8. This circuit employ a Wheatstone bridge 801 configuration composed of piezoresistive elements on the pressure or force sensing mechanically compliant membrane as before along with a compensation bridge circuit 802 composed of resistors of equal values to form a Wheatstone bridge circuit 802 that is located on the bulk part of the substrate that undergoes no deflection and thus the circuit's 802 response is dependent on the temperature only. The shape and size of compensation bridge circuit 802 resistors are identical to the corresponding piezoresistive elements of the sensor bridge 801. Differential amplifiers 803 are used to amplify and convert the double-ended bridge out-put to a single-ended signal. An analog subtractor circuit 804 can be used to generate the difference of the two bridge 801 and 802 outputs. The output of the subtractor circuit 804, Vout 806, is a unipolar signal. An analog to digital converter circuit (not shown) can be used to digitize the signal from the subtractor circuit 804 and perform additional compensation corrections as needed. The biasing input voltage 805 is shown as Vin.

Figure 9A:
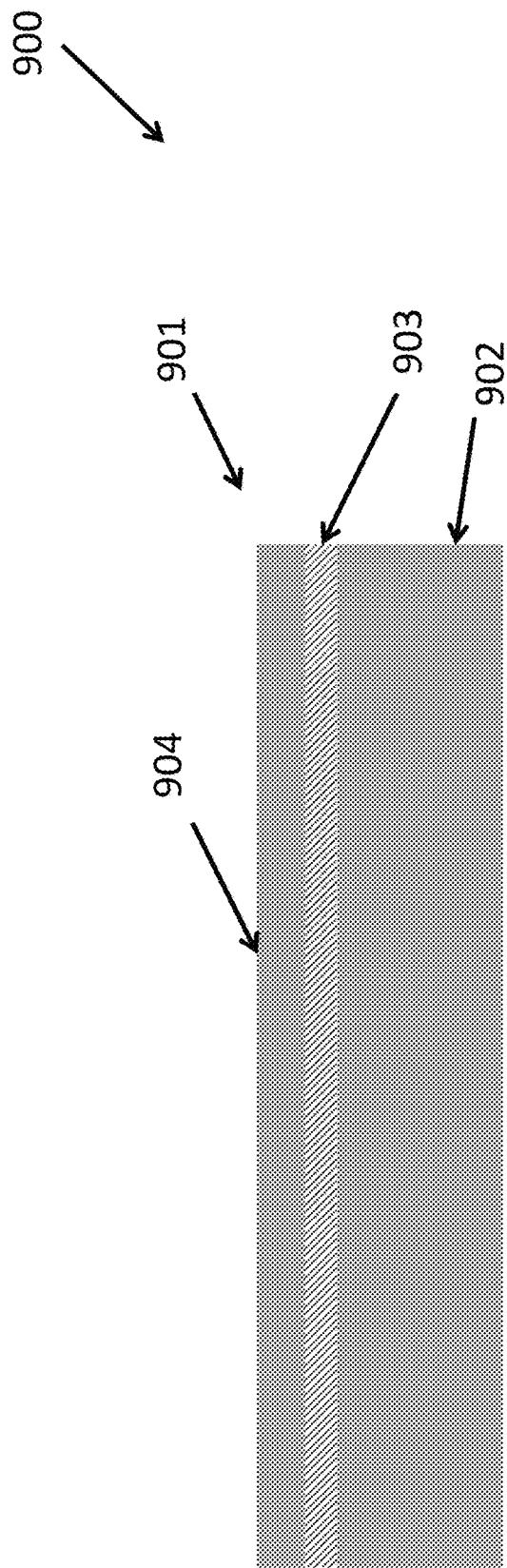

The embodiment for the manufacturing the sensors 900 of the present disclosure is described and shown in cross sectional drawings in FIGS. 9A-9J. It is noted that these cross sectional illustrations are not to scale dimensionally. The starting substrate is a silicon-on-insulator (SOI) wafer 901 that is composed of a single-crystal silicon handle wafer 902 having a pre-determined thickness, a buried silicon dioxide layer 903 also having a pre-determined thickness, and a single-crystal silicon device layer 904 also having a pre-determined thickness (FIG. 9A). The thickness of the handle wafer 902 can be any value that can reasonably be handled and processed in manufacturing, including thicknesses down to tens of microns, and can have a value of thickness that also can be reasonably etched using available etching techniques up to millimeters in thickness. Similarly, the buried silicon dioxide layer 903 can be any reasonable thickness ranging from a few tens of nanometers to several microns. The device layer 904 can be any reasonable thickness ranging from tens of nanometers to hundreds of microns. Since SOI wafers 901 can be made with a wide range of handle wafer 902, buried silicon dioxide layer 903 and device layer 904 thicknesses, this affords enormous flexibility and freedom to customize the sensor manufacturing process 900 to implement a sensor for nearly any application.

For example, a thinner device layer 904 thickness (that will determine the thickness of the sensor membrane 914) can be used to make a sensor having a lower pressure or force sensing range, down to less than one Pascal, or one Newton, or one with a higher pressure or force sensing range, up to tens to hundreds of millions of Pascals, or tens to hundreds of millions of Newtons. Additionally, the sensitivity of the sensor to pressure or forces can also be tailored depending on the thickness of the device layer be any value of sensitivity desired down to $10^{-10}$ V/Pa-V or even lower.

The low background doping concentration of the silicon device layer is $10^{17}$ n-type dopant atoms per centimeter cubed.

While the embodiment of the sensor manufacturing process 900 shown in FIG. 9 presents the use of a silicon-based SOI wafer 901, it is important to point out that other SOI 901 substrate materials and material systems configurations may be used in this process for the handle wafer 902 and the device layer 904 including: polycrystalline silicon (polysilicon); silicon carbide (SiC), gallium nitride (GaN); indium phosphide (InP), and others, thereby enabling sensors for even a wider range of applications such as for extremely harsh environments wherein the sensor is exposed to corrosive and/or aggressive chemicals, and extreme temperatures (e.g, 500-degrees Celsius and higher). Additionally, the buried silicon dioxide layer 903 in the SOI wafer 901 can be replaced with any number of electrically and/or thermally insulating layers including: silicon nitride ($Si_xN_{1-x}$); oxy-silicon nitride ($SiO_xN_y$); aluminum oxide ($Al_xO_y$); titanium oxide ($Ti_xO_y$); hafnium oxide ($Hf_xO_y$); as well as any thin-film material or material system layer that can act as either an electrically or thermally insulating layer, and that can be formed into use as a buried layer 903 in a SOI wafer 901 configuration (the x and y subscripts indicate that the material system can have any known stoichiometry of the elemental constituents). Importantly, using wafer bonding and thinning techniques as well as newer materials and material systems layer deposition and processing techniques affords unprecedented freedom for the selection of the composition and thicknesses of the handle wafer 902, the buried oxide layer 903 and the device layer 904 for a huge number of applications.

Using the SOI wafer 901 as the starting substrate, a masking material layer 905 is deposited on the surface of the device layer 904 and then patterned on the using lithographic techniques. The lithographic techniques used to transfer the desired patterns into the masking layer in FIG. 9B can be photolithographic, or direct-write lithography both of which are well known in the art.

Figure 9B:
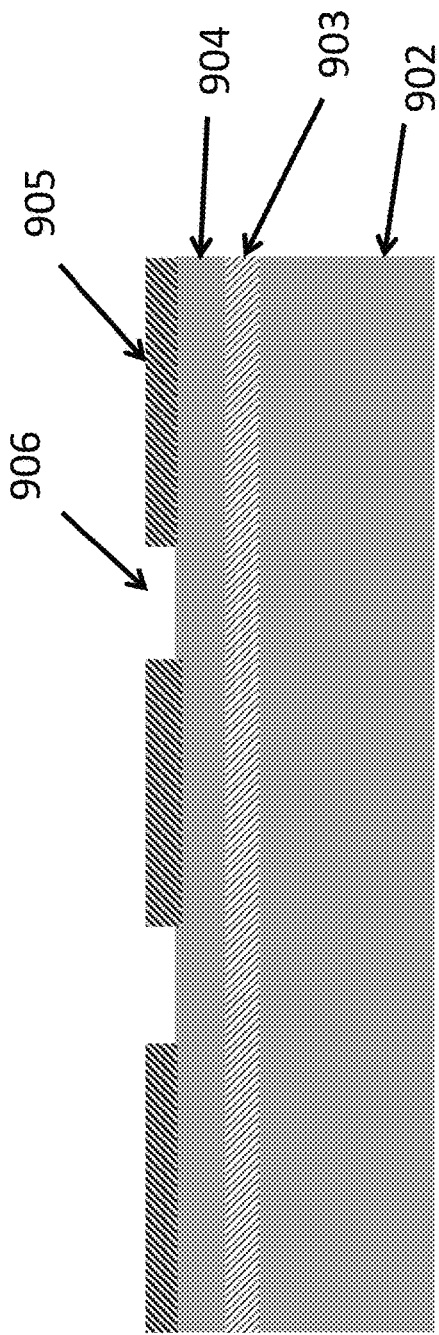

Any deposited material layer can be used as this masking layer 905 including: photoresist; silicon dioxide, silicon nitride; oxy-silicon nitride, as well as any material or material system layer that can be used as a masking layer 905 for either ion implantation or diffusion of impurity dopants into the device layer 904 of the SOI wafer 901. If a photoresist layer is used as the masking layer 905, it can be directly patterned and used as the masking layer 905 for ion implantation. However, if a non-organic material layer is used as the masking layer 905 such as silicon dioxide, silicon nitride, or oxy-silicon nitride, etc., then a photoresist would be patterned on top of the non-organic material layer using lithography and then the non-organic ion implantation masking layer 905 would be etched using the appropriate reactive ion etching (RIE) method for that material. The material layer acting as a masking layer 905 after being patterned illustrating the open areas 906 that expose the top surface of the device layer 904 in limited regions is shown in FIG. 9B.

Using the masking layer 905 that has been patterned, the areas opened 906 in the mask layer 905 have dopants (for the piezoresistive elements 907) introduced into the exposed areas 906 of the silicon device layer 904. The dopants being introduced into the exposed areas 906 in the device layer 904 are blocked from reaching the device layer 904 in the areas covered by the masking layer 905 as shown in FIG. 9C. The silicon doped areas (for the piezoresistive elements 907) will be the piezoresistive elements for the sensor. The dopants introduced can be either p-type or n-type, but as discussed above, higher piezoresistive coefficients and gauge factors are obtained using p-type dopants such as boron at dopant concentrations below $10^{18}$ atoms/cm$^3$.

The dopants can be introduced into the selected areas (for the piezoresistive elements 907) of the device layer 904 using either diffusion followed by a drive-in, or ion implantation followed by an anneal. Diffusion is performed by using either gas or solid-state sources in a furnace tube at an elevated temperature. A carrier gas is passed through the furnace tube that may contain an oxidizing species. In the case of a diffusion process using a gas source, a carrier gas transports the boron containing species gas in the tube to the wafer surfaces where the boron diffuses into the silicon surface due to the concentration gradient existing across the boundary between the gas and silicon surface interface. In the case of solid-source diffusion, solid ceramic wafers with a high concentration of boron are placed into a carrier boat in close proximity to the wafers to be doped and placed into a furnace tube at an elevated temperature. The boron diffuses out of the solid source creating a gas with a high boron concentration near the silicon wafer surfaces. This concentration gradient at the silicon wafer surface causes the boron to diffuse into the silicon wafer surface. Diffusion relies on the elevated temperatures, typically 1000-degrees Celsius or higher to accelerate the diffusion process. Often after the dopant has been diffused into the silicon wafer surface, a drive-in processing step is performed wherein the wafer is placed into a furnace tube at an elevated temperature and the diffused dopants further diffuse deeper into the silicon substrate. This also results in a more uniform dopant profile in the substrate.

In ion implantation, boron ions are accelerated by a high electric field and targeted to impinge into the silicon surface. The boron atoms injected into the silicon do not become substitution donor atoms in the silicon crystalline lattice after implantation and further the silicon crystal lattice undergoes considerable damage that disrupts the electrical behavior of the silicon semiconductor. Therefore, ion implantation is always followed by an anneal at an elevated temperature that serves to activate the boron atoms whereby the boron atoms substitute into the silicon crystal lattice and the damage to the silicon crystal lattice is largely repaired.

The amount of dopants introduced into the piezoresistive elements 907 can be varied depending on the application and sensitivity desired. Therefore, this affords yet another factor adding to the flexibility of the sensor design for a wide range of applications.

The masking layer 905 is then removed from the top surface of the device layer 904 as shown in FIG. 9D.

Figure 9E:
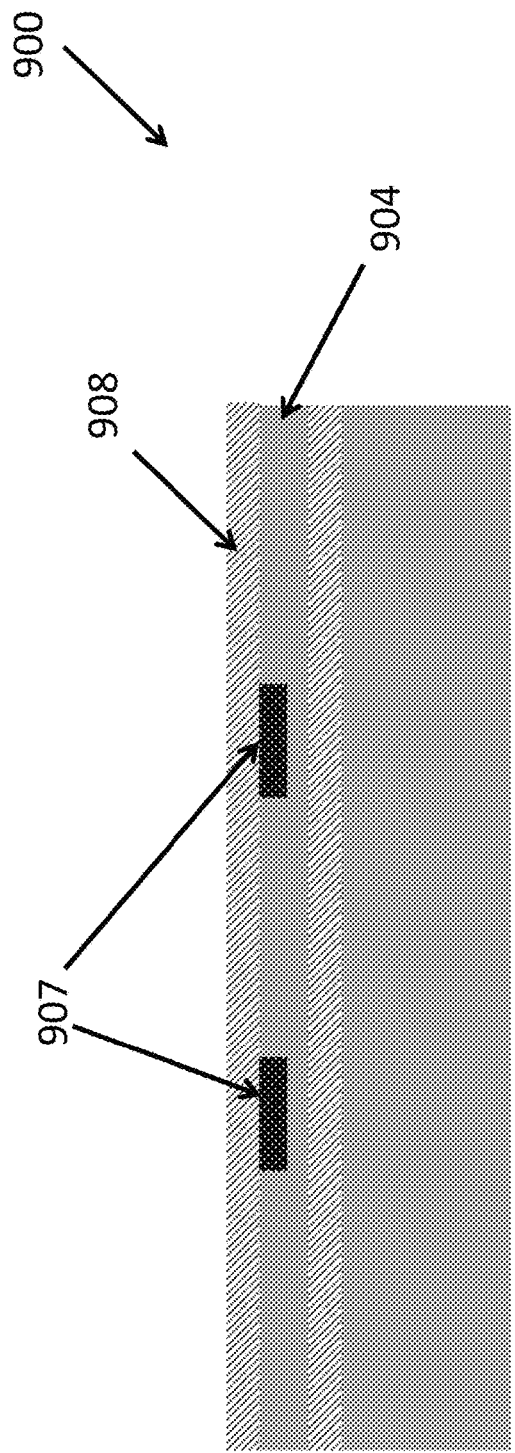

Next, an electrically insulating layer 908 is deposited onto the surface of the device layer 904 including the regions doped with boron 907 as shown in FIG. 9(E). This insulating layer 908 could be silicon dioxide, silicon nitride, oxy-silicon nitride, or any material that can be deposited in thin-films onto silicon substrate surfaces and is electrically insulating.

Figure 9F:
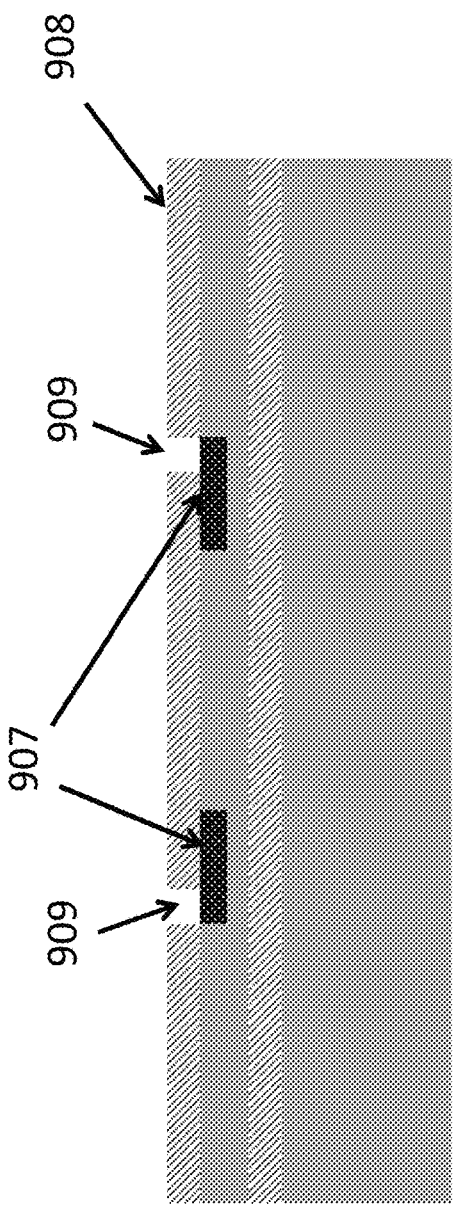

A lithography is performed by depositing photoresist on the surface of the deposited electrically insulting layer 908 followed by an aligned exposure and development. The photoresist is patterned in order to open areas in the insulating layer 908. Next a reactive ion etch (RIE) is performed to etch the exposed regions of the deposited insulating layer 908 to open up areas that will serve as electrical contact vias 909 to the piezoresistive elements 907 The photoresist is then removed and the result in cross section is shown in FIG. 9F.

Subsequently, a thin-film layer of an electrically conducting layer 910 is deposited onto the surface of the insulating layer 908. This electrically conducting layer can be made of any metal or metal alloy that can be deposited in thin-film form including: aluminum; aluminum-silicon; gold; silver; platinum; copper; refractory metals; conductive ceramics; or metal silicides and metal oxides. Importantly, prior to the deposition of this conducting layer 910, the top most surface of the exposed piezoresistive elements 907 may be cleaned of any surface residue or oxidants so that the metal conducting layer 910 can make ohmic electrical contact 911 to the piezoresistive elements. The result is shown in FIG. 9G.

A lithography is again performed by depositing photoresist on the surface of the deposited conducting layer 910 followed by an aligned exposure and development. The photoresist is patterned in order to make a masking layer for patterning the conducting layer 910. A reactive ion etch (RIE) or wet etch is then performed to pattern the deposited conducting layer 910 into an electrical wiring configuration of choice including a Wheatstone bridge circuit. The photoresist is then removed and the result is illustrated in FIG. 9H.

A lithography is performed on the backside of the handle wafer 902 of the SOI wafer 901 by depositing photoresist on the surface of the backside of the handle wafer 902 followed by an aligned exposure and development. The photoresist is patterned in order to make a masking layer for removing a section 913 of the handle wafer 902 to form a membrane 914. A deep high-aspect ratio reactive ion etch, preferably a DRIE, is then performed to etch the exposed region (by removing section 913) of the backside of the handle wafer 902. DRIE etching can be performed to depths of hundreds to thousands of microns and has nearly vertical sidewalls 915. The use of DRIE avoids the problem of wet anisotropic etchants that result in a sloped sidewalls that wastes significant amount of die area. The photoresist on the SOI wafer 901 is then removed. The result in shown in FIG. 9I. While examples using DRIE etching are provided, examples of the present disclosures are not limited to DRIE etching.

Lastly, the exposed portion 916 of the buried oxide layer 903 on the backside of the membrane 914 formed in the device layer 904 may be removed using a vapor hydrofluoric acid as shown in FIG. 9J. Some type of protection of the material layers on the front-side of the processed SOI wafer 901 during the vapor hydrofluoric acid etch may be used such as deposited photoresist, a special etching fixturing, or a bonded wafer using a polymer. If a protective layer is used, it will be removed at the completion of the etch. The buried oxide layer 903 may or may not be removed depending on the application since the presence of the buried oxide layer 903 can add more mechanical rigidity to the sensor membrane 914 as well as increased chemical robustness.

Figure 10:
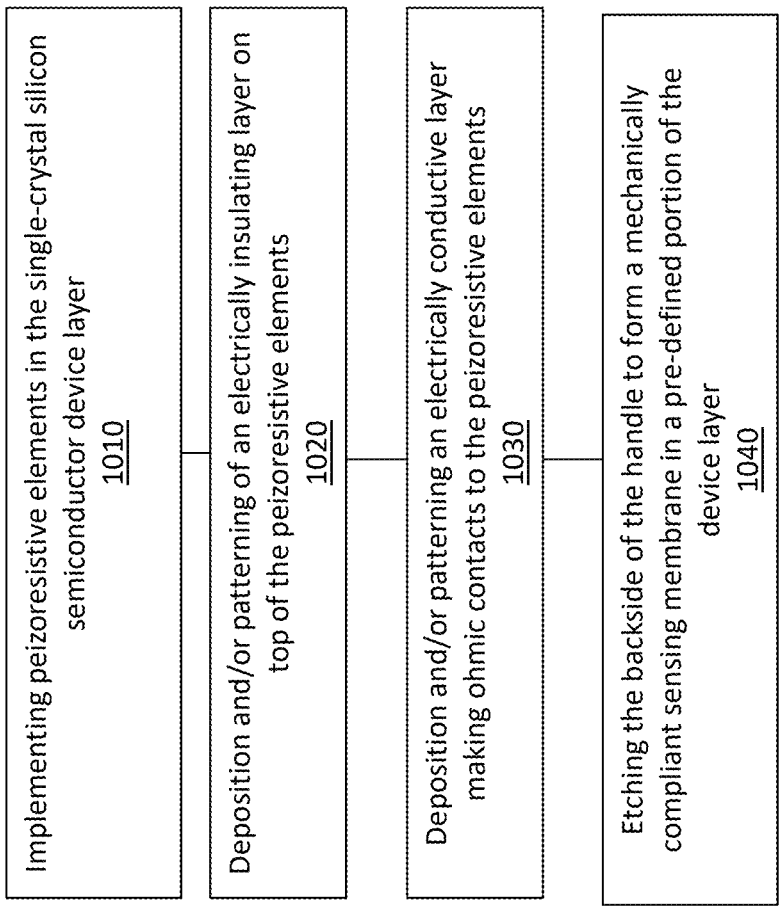
FIG. 10 illustrates steps of a method for fabrication of a pressure or force sensor comprised of a silicon device layer and silicon substrate, according to an example embodiment.

FIG. 10 illustrates steps of a method for fabrication of a pressure or force sensor comprised of a substrate. While operations in FIG. 10 are shown in a specific order, one or more of the operations may be omitted, substituted by another operations, and/or repeated.

The substrate may include a handle wafer having a pre-determined thickness; a buried electrically insulating layer having a pre-determined thickness; and a single-crystal silicon semiconductor device layer having a pre-determined thickness and a low background dopant concentration. While not shown in FIG. 10, the method may include operations for obtaining the substrate. The processing steps shown in FIG. 10 may be performed on the substrate.

The method for fabrication of a pressure or force sensor may include: implementing piezoresistive elements in the single-crystal silicon semiconductor device layer (step 1010), deposition and patterning of an electrically insulating layer on top of the piezoresistive elements (step 1020); deposition and patterning an electrically conductive layer making ohmic contacts to the piezoresistive elements (step 1030); and/or etching a deep, high-aspect ratio etch on the backside of the handle wafer stopping on the buried electrically insulating layer to form a mechanically compliant sensing membrane in a pre-defined portion of the device layer (step 1040).

It is noted that one of the most important attributes of some example embodiments of the present disclosure is the flexibility this design and fabrication approach provides to designers of sensors for measuring pressures and forces in the widest range of applications. Specifically, at least some example embodiments allow the designer to choose to vary the following parameters: handle wafer thickness and material type; buried oxide thickness and material type; device layer thickness and material type; area of the mechanically compliant sensing membrane; dopant type and concentration thereby determining the piezoresistive coefficients of the piezoresistive elements; type of material or material system, and thickness used on the top surface of the sensing membrane for use as the electrically insulating layer; and type of material or material system, thickness used on the top surface of the sensor insulating layer for use as the electrically conducting layer; whether the backside oxide is removed or not; and the circuit used to readout the piezoresistive elements response. Using this enormous design and implementation flexibility allows a sensor for measuring either pressures or forces with unprecedented levels of sensitivities to be made; a means for rapidly designing and implementing at low cost a pressure or force sensor for specific applications, including harsh environments comprised of high temperatures (e.g., 250 degrees Celsius or higher using silicon device layer, and 500 degrees Celsius for silicon carbide device layer) and exposure to chemically corrosive agents. Additionally, the use of DRIE etching for the backside etching to form the sensing membrane allows the sensor die size to be dramatically reduced thereby resulting in a lower sensor cost.

Moreover, the examples of the present disclosure allow for better control of the manufacturing processes on the critical elements such as the membrane size and thickness thereby resulting in a device that does not need the costing calibration methods used on present technologies for pressure and force sensor devices.

Figure 11:
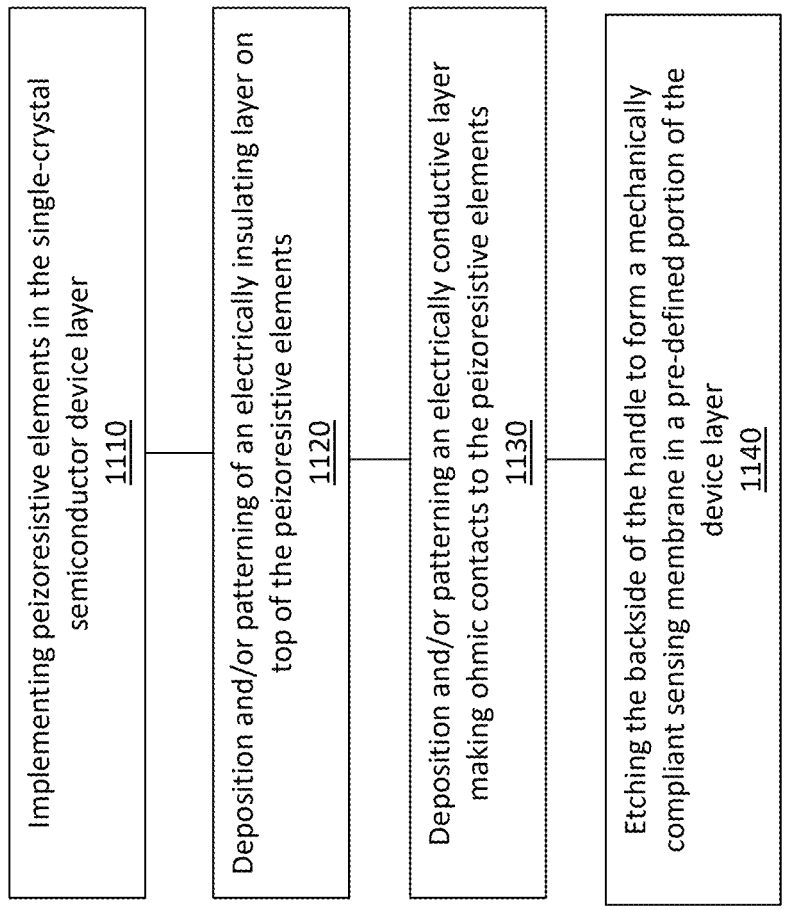
FIG. 11 illustrates steps of a method for fabrication of a pressure or force sensor comprised of any material type of semiconductor device layer and substrate, according to an example embodiment.

FIG. 11 illustrates steps of a method for fabrication of a pressure or force sensor comprised of any material type of semiconductor substrate. While operations in FIG. 11 are shown in a specific order, one or more of the operations may be omitted, substituted by another operations, and/or repeated.

The substrate may include a handle wafer having a pre-determined thickness; a buried electrically insulating layer having a pre-determined thickness; and a single-crystal silicon semiconductor device layer having a pre-determined thickness and a low background dopant concentration. While not shown in FIG. 11, the method may include operations for obtaining the substrate. The processing steps shown in FIG. 11 may be performed on the substrate.

The method for fabrication of a pressure or force sensor may include: implementing piezoresistive elements in the single-crystal semiconductor device layer (step 1110) including silicon carbide (SiC), gallium nitride (GaN), indium phosphide (InP), etc., deposition and patterning of an electrically insulating layer on top of the piezoresistive elements (step 1120); deposition and patterning an electrically conductive layer making ohmic contacts to the piezoresistive elements (step 1130); and/or etching a deep, high-aspect ratio etch on the backside of the handle wafer stopping on the buried electrically insulating layer to form a mechanically compliant sensing membrane in a pre-defined portion of the device layer (step 1140).

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A micro-scale pressure or force sensor device comprising:
   a plurality of piezoresistive sensing elements located on a mechanically-compliant sensing membrane; and
   a silicon-on-insulator (SOI) substrate comprising a single-crystal silicon handle wafer having a pre-determined thickness, a buried silicon dioxide layer having a pre-determined thickness disposed on a surface of the handle wafer, and a single-crystal silicon device layer disposed on a surface of the buried silicon dioxide layer and having a pre-determined thickness and a low background dopant concentration, wherein the single-crystal silicon device layer comprises the sensing membrane with a pre-determined membrane thickness controlled to within a +/−0.25 micron tolerance or smaller that is made from the single-crystal silicon device layer by removing a pre-determined portion of the single-crystal silicon handle wafer corresponding to a position of the sensing membrane using lithography and a portion of the buried silicon dioxide layer using high-aspect ratio reactive ion etch, and the sensing membrane has a pre-determined area controlled to 1% or less tolerance on each edge length of the sensing membrane.

2. The sensor device of claim 1, further comprising an electrically insulating layer disposed on a surface of the single-crystal silicon device layer, an electrically conducting layer disposed at least partially in the electrically insulating layer and on a surface of the electrically insulating layer; and wherein the plurality of piezoresistive elements are disposed at least partially in the single-crystal silicon device layer and are electrically coupled to the electrically conducting layer.

3. The sensor device of claim 2, wherein device parameters that are varied during manufacturing to implement a device for a specific application include: a handle wafer thickness, the buried silicon dioxide thickness, the device layer thickness, the area of the sensing membrane, dopant type and concentration of the sensing membrane, the thickness and type of material or material system used as the electrically insulating layer, the thickness and type of material or material system used on as the electrically conducting layer, the dopant level concentration of the plurality of piezoresistive elements, and whether the backside of the buried silicon dioxide layer is removed or not.

4. The sensor device of claim 1, wherein pressure sensitivity of the sensor is $9 \times 10^{-10}$ V/Pa-V or lower, or a force sensitivity of the sensor is $9 \times 10^{-10}$ V/Pa-V or lower multiplied by a sensing membrane area.

5. The sensor device of claim 1, wherein pressure sensing of the device has a resolution of one Pascal, and force sensing of the device has a resolution of one micro-Newton or less.

6. The sensor device of claim 1, wherein the pressure sensing range of the device has a maximum level of billions of Pascals, and the force sensing range of the device has a maximum level of tens of billions of Newtons or more.

7. The sensor device of claim 1, wherein the plurality of piezoresistive elements include gauge factors of 180 or more.

8. The sensor device of claim 1, wherein the plurality of piezoresistive elements include gauge factors of 160 or more.

9. The sensor device of claim 1, wherein non-linearity of the device is 0.24% or less, and a temperature coefficient of the device pressure sensitivity is 82 micro-V/psi-degree C. or less.

10. The sensor device of claim 1, wherein the plurality of piezoresistive elements include four piezoresistive elements having an approximately equal un-strained resistor values positioned at the edges of the sensing membrane and configured into a Wheatstone bridge circuit.

11. The sensor device of claim 10, wherein a first pair of piezoresistive elements of the four piezoresistive elements are positioned orthogonally to the edge of the sensing membrane on opposing sides of the sensing membrane, and a second pair of piezoresistive elements of the four piezoresistive elements are positioned parallel to the edge of the sensing membrane on the other two opposing sides of the sensing membrane.

12. The sensor device of claim 1, wherein a first pair of piezoresistive elements of the plurality of piezoresistive elements are positioned parallel to an edge of the sensing membrane on opposing sides of the sensing membrane, and two pairs of parallel-aligned piezoresistive elements of the plurality of piezoresistive elements are positioned orthogonally to the edge of the sensing membrane on the other two opposing sides of the sensing membrane.

13. The sensor device of claim 1, wherein the piezoresistive elements are disposed in the silicon device layer with a background doping concentration of $10^{17}$ n-type dopant atoms per centimeter cubed, and the plurality of piezoresistive elements are formed by doping a pre-defined region of the silicon device layer with boron having a concentration of $10^{18}$ dopant atoms per centimeter cubed.

14. The sensor device of claim 12, wherein two parallel piezoresistive elements positioned orthogonally to an edge of the sensing membrane on opposing sides of the sensing membrane are electrically connected in series.

15. The sensor device of claim 1, wherein the plurality of piezoresistive elements are configured into a Wheatstone bridge circuit, with series and parallel resistors positioned in the circuit to bias the Wheatstone bridge, to provide for temperature compensation of the piezoresistive elements, and to be balanced for a zero-offset voltage.

16. The sensor device of claim 1, further comprising:
a first differential amplified circuit;
a second differential amplified circuit; and
Wheatstone bridge circuit, wherein the Wheatstone bridge circuit comprises the plurality of piezoresistive elements disposed on the sensing membrane and a compensation bridge circuit composed of resistors of equal value located on a bulk part of the single-crystal silicon device layer undergoing no deflection, the Wheatstone bridge circuit output is signaled through the first differential amplified circuit, and the compensation bridge circuit output signaled through the second differential amplified circuit, and the outputs from the first and second differential amplifiers is signaled through a subtractor circuit to amplify and convert the double-ended bridge output to a single-ended signal.

17. The sensor device of claim 16, further comprising an analog to digital converter circuit, wherein output signal from the subtractor circuit is signaled through the analog to digital converter circuit to digitize the signal and perform additional compensation corrections.

18. The sensor device of claim 1, wherein the operating temperature of the device is 250 degrees Celsius or higher.

19. The sensor device of claim 1, wherein the plurality of piezoresistive elements have a sheet resistance of 200 ohms/square.

20. A micromachined pressure or force sensor device comprising:
a plurality of piezoresistive sensing elements located on a mechanically compliant sensor membrane;
a semiconductor-on-insulator substrate comprising a handle wafer having a pre-determined thickness, a buried electrically insulating layer having a pre-determined thickness and a single-crystal semiconductor device layer having a pre-determined thickness with a low background dopant concentration,
wherein the single-crystal semiconductor device layer comprises the sensor membrane with a pre-determined membrane thickness that is made by removing a predetermined portion of the handle wafer corresponding to a position of the sensor membrane using lithography and a portion of the buried electrically insulating layer using high-aspect ratio reactive ion etch;

a first differential amplified circuit;

a second differential amplified circuit; and

Wheatstone bridge circuit, wherein the Wheatstone bridge circuit comprises the plurality of piezoresistive elements disposed on the sensing membrane and a compensation bridge circuit composed of resistors of equal value located on a bulk part of the single-crystal semiconductor device layer undergoing no deflection, the Wheatstone bridge circuit output is signaled through the first differential amplified circuit, and the compensation bridge circuit output signaled through the second differential amplified circuit, and the outputs from the first and second differential amplifiers is signaled through a subtractor circuit to amplify and convert the double-ended bridge output to a single-ended signal.

* * * * *